United States Patent
Itoh

(10) Patent No.: US 10,423,368 B2
(45) Date of Patent: Sep. 24, 2019

(54) IMAGE FORMING APPARATUS, METHOD FOR CONTROLLING SAME, AND STORAGE MEDIUM

(71) Applicant: CANON KABUSHIKI KAISHA, Tokyo (JP)

(72) Inventor: Isami Itoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/010,825

(22) Filed: Jun. 18, 2018

(65) Prior Publication Data
US 2018/0373472 A1 Dec. 27, 2018

(30) Foreign Application Priority Data
Jun. 23, 2017 (JP) ................. 2017-123563

(51) Int. Cl.
*H04N 1/52* (2006.01)
*H04N 1/409* (2006.01)
*G06F 3/12* (2006.01)
*H04N 1/60* (2006.01)

(52) U.S. Cl.
CPC .......... *G06F 3/1208* (2013.01); *G06F 3/1254* (2013.01); *H04N 1/4092* (2013.01); *H04N 1/52* (2013.01); *H04N 1/6033* (2013.01); *H04N 1/6036* (2013.01)

(58) Field of Classification Search
CPC ............................. H04N 1/4055; H04N 1/52
See application file for complete search history.

(56) References Cited

U.S. PATENT DOCUMENTS

| | | | |
|---|---|---|---|
| 5,766,807 A | 6/1998 | Delabastita et al. | |
| 6,381,037 B1* | 4/2002 | Balasubramanian | H04N 1/6033 358/3.23 |
| 6,384,895 B1* | 5/2002 | Sawano | H04N 1/4015 347/183 |
| 6,803,932 B2 | 10/2004 | Itoh et al. | |
| 9,851,672 B2 | 12/2017 | Itoh | |
| 2010/0046035 A1* | 2/2010 | Kinoshita | H04N 1/405 358/3.06 |
| 2010/0134850 A1* | 6/2010 | Matsuzaki | H04N 1/6055 358/448 |
| 2011/0255134 A1* | 10/2011 | Shigeta | B41C 1/05 358/3.3 |

FOREIGN PATENT DOCUMENTS

JP   08-305005 A   11/1996

\* cited by examiner

*Primary Examiner* — King Y Poon
*Assistant Examiner* — Michael Burleson
(74) *Attorney, Agent, or Firm* — Venable LLP

(57) ABSTRACT

The present image forming apparatus, upon accepting, in accordance with a user input, an instruction for execution of processing for adjusting an image forming condition, forms a predetermined test pattern on a sheet, and detects the density of the predetermined test pattern. Furthermore, the image forming apparatus obtains an area ratio of halftone dots in a highlight region of a formed image from the detected density, and, based on the area ratio of halftone dots, decides a smallest dot size for a screen that represents a halftone of the highlight region by a dither pattern.

12 Claims, 19 Drawing Sheets

A  B  C  D  E  F

| | JAGGEDNESS (NOISE) | PSEUDO CONTOUR | LIKELIHOOD FOR DOT TO BE HARD TO NOTICE |
|---|---|---|---|
| SCREEN A | ✗ | ✗ | ○ |
| SCREEN B | ✗ | △ | ○ |
| SCREEN C | ○ | ○ | ○ |
| SCREEN D | ○ | ○ | ○ |
| SCREEN E | ○ | ○ | △ |
| SCREEN F | ○ | ○ | △ |

STATUS A

VISION SPECTRAL CHARACTERISTIC (VISUAL)

FIG. 22A

| 92 | 56 | 40 | 76 | 96 | 94 | 58 | 42 | 78 | 98 |
|----|----|----|----|----|----|----|----|----|----|
| 72 | 28 | 12 | 32 | 80 | 74 | 30 | 14 | 34 | 82 |
| 44 | 8  | 0  | 16 | 48 | 46 | 10 | 2  | 18 | 50 |
| 60 | 20 | 4  | 24 | 68 | 62 | 22 | 6  | 26 | 70 |
| 84 | 52 | 36 | 64 | 88 | 86 | 54 | 38 | 66 | 90 |
| 95 | 59 | 43 | 79 | 99 | 93 | 57 | 41 | 77 | 97 |
| 75 | 31 | 15 | 35 | 83 | 73 | 29 | 13 | 33 | 81 |
| 47 | 11 | 3  | 19 | 51 | 45 | 9  | 1  | 17 | 49 |
| 63 | 23 | 7  | 27 | 71 | 61 | 21 | 5  | 25 | 69 |
| 87 | 55 | 39 | 67 | 91 | 85 | 53 | 37 | 65 | 89 |

FIG. 22B

| 92 | 56 | 40 | 76 | 96 | 94 | 58 | 42 | 78 | 98 |
|----|----|----|----|----|----|----|----|----|----|
| 72 | 28 | 3  | 32 | 80 | 74 | 30 | 17 | 34 | 82 |
| 44 | 2  | 0  | 4  | 48 | 46 | 16 | 14 | 18 | 50 |
| 60 | 5  | 1  | 6  | 68 | 62 | 19 | 15 | 20 | 70 |
| 84 | 52 | 36 | 64 | 88 | 86 | 54 | 38 | 66 | 90 |
| 95 | 59 | 43 | 79 | 99 | 93 | 57 | 41 | 77 | 97 |
| 75 | 31 | 24 | 35 | 83 | 73 | 29 | 10 | 33 | 81 |
| 47 | 33 | 21 | 25 | 51 | 45 | 9  | 7  | 11 | 49 |
| 63 | 26 | 22 | 27 | 71 | 61 | 12 | 8  | 13 | 69 |
| 87 | 55 | 39 | 67 | 91 | 85 | 53 | 37 | 65 | 89 |

FIG. 23A

| 92 | 56 | 40 | 76 | 96 | 94 | 58 | 42 | 78 | 98 |
|---|---|---|---|---|---|---|---|---|---|
| 72 | 28 | 12 | 32 | 80 | 74 | 30 | 14 | 34 | 82 |
| 44 | 8 | 0 | 16 | 48 | 46 | 10 | 2 | 18 | 50 |
| 60 | 20 | 4 | 24 | 68 | 62 | 22 | 6 | 26 | 70 |
| 84 | 52 | 20 | 64 | 88 | 86 | 54 | 38 | 66 | 90 |
| 95 | 59 | 43 | 79 | 99 | 93 | 57 | 41 | 77 | 97 |
| 75 | 31 | 15 | 35 | 83 | 73 | 29 | 13 | 33 | 81 |
| 47 | 11 | 3 | 19 | 51 | 45 | 9 | 1 | 17 | 49 |
| 63 | 23 | 7 | 27 | 71 | 61 | 21 | 5 | 25 | 69 |
| 87 | 55 | 39 | 67 | 91 | 85 | 53 | 37 | 65 | 89 |

FIG. 23B

| 92 | 56 | 40 | 76 | 96 | 94 | 58 | 42 | 78 | 98 |
|---|---|---|---|---|---|---|---|---|---|
| 72 | 28 | 3 | 32 | 80 | 74 | 30 | 13 | 34 | 82 |
| 44 | 2 | 0 | 4 | 48 | 46 | 12 | 10 | 14 | 50 |
| 60 | 20 | 1 | 24 | 68 | 62 | 22 | 15 | 26 | 70 |
| 84 | 52 | 36 | 64 | 88 | 86 | 54 | 38 | 66 | 90 |
| 95 | 59 | 43 | 79 | 99 | 93 | 57 | 41 | 77 | 97 |
| 75 | 31 | 18 | 35 | 83 | 73 | 29 | 8 | 33 | 81 |
| 47 | 17 | 15 | 19 | 51 | 45 | 7 | 5 | 9 | 49 |
| 63 | 23 | 16 | 27 | 71 | 61 | 21 | 6 | 25 | 69 |
| 87 | 55 | 39 | 67 | 91 | 85 | 53 | 37 | 65 | 89 |

IMAGE FORMING APPARATUS, METHOD FOR CONTROLLING SAME, AND STORAGE MEDIUM

BACKGROUND OF THE INVENTION

Field of the Invention

The present invention relates to an image forming apparatus, a method for controlling the same, and a storage medium.

Description of the Related Art

Image formation in accordance with an electronic photographic method employs an electrophotographic process in which a surface of a photosensitive member is uniformly charged, this surface is exposed such as by a laser beam modulated in accordance with an image signal to form an electrostatic latent image, the electrostatic latent image is developed by toner, and the toner image is transferred to a recording material. In other words, when the photosensitive member that is uniformly charged is exposed by the laser beam in accordance with the image signal, the electric potential of the exposed photoreceptor surface attenuates, and an electrostatic latent image is formed at the exposed portion. When a development bias is applied between the photosensitive member where the electrostatic latent image is formed and a carrier of developer, the electrostatic latent image is developed by toner adhering thereto in accordance with a potential difference between the potential after the exposure and a developing potential. By transferring a toner image formed in this way to a recording material such as a sheet, an image is formed on the recording material.

In addition, reproduction of a halftone by AM (Amplitude Modulation) screening of the electronic photographic method is represented by changing the size of a halftone dot. For reproducibility of a halftone, there are differences due to the type of a machine, an operating environment, a number of sheets used, or the like, and tone reproducibility is guaranteed by applying a gamma correction. However, even if the tone reproducibility is improved by applying a gamma correction, reproduction of a line or halftone dots at a highlight region is unstable, and there is a problem in that this is recognized as noise.

Accordingly, in an electronic photographic method image forming apparatus or a printing apparatus that represents a halftone by using dots such as halftone dots, efforts to more faithfully reproduce halftone dots have been made conventionally. As an example of such a technique, Japanese Patent Laid-Open No. H08-305005 proposes a method for realizing halftone dot reproduction by at least two modulation methods.

However, even in a case where such frequency modulation is used to perform a tone representation, with an electronic photographic method image forming apparatus, there are cases where, in accordance with a usage situation of the image forming apparatus, disappearance or absence of dots occur, and an image that is formed ends up with bad graininess. For example, in a case of attempting to improve reproducibility for a highlight region by enlarging the dot size of a highlight by using screening in accordance with frequency modulation, there is the possibility of the reproducibility of the highlight deteriorating due to a change of state of the machine, and accordingly, the same problem as with AM screening highlights as described above occurs when the reproducible dot size has changed. In a case where the reproducibility of a highlight is poor, because a tone reproduction range is small, it is easier for an image defect such as a pseudo contour to occur even if tone reproducibility is improved by performing a gamma correction.

SUMMARY OF THE INVENTION

The present invention enables realization of a mechanism for stabilizing tone reproducibility and suppressing occurrence of noise or a pseudo contour by suitably deciding a dot size of an AM screen in accordance with an environment variable or a usage situation for an apparatus.

One aspect of the present invention provides an image forming apparatus, the apparatus comprising: a user interface that accepts, in accordance with user input, an instruction for execution of processing for adjusting an image forming condition; an image forming unit that forms a predetermined test pattern on a sheet in response to the acceptance of the instruction by the user interface; a reading unit that detects a density of the predetermined test pattern formed on the sheet by the formation unit; a memory device that stores a set of instructions; and at least one processor that executes the set of instructions to: obtain an area ratio of halftone dots in a highlight region of an image formed by the image forming unit, from the density detected by the reading unit, and decide, based on the obtained area ratio of halftone dots, a smallest dot size of a screen for representing, by a dither pattern, a halftone of the highlight region.

Another aspect of the present invention provides a method of controlling an image forming apparatus, the method comprising: accepting, in accordance with user input, an instruction for execution of processing for adjusting an image forming condition; forming a predetermined test pattern on a sheet in response to the acceptance of the instruction; detecting a density of the predetermined test pattern formed on the sheet; obtaining an area ratio of halftone dots in a highlight region of an image formed, from the density detected; and deciding, based on the obtained area ratio of halftone dots, a smallest dot size of a screen for representing, by a dither pattern, a halftone of the highlight region.

Still another aspect of the present invention provides a non-transitory computer-readable storage medium storing a computer program for causing a computer to execute each step in a method of controlling an image forming apparatus, the method comprising: accepting, in accordance with user input, an instruction for execution of processing for adjusting an image forming condition; forming a predetermined test pattern on a sheet in response to the acceptance of the instruction; detecting a density of the predetermined test pattern formed on the sheet; obtaining an area ratio of halftone dots in a highlight region of an image formed, from the density detected; and deciding, based on the obtained area ratio of halftone dots, a smallest dot size of a screen for representing, by a dither pattern, a halftone of the highlight region.

Further features of the present invention will be apparent from the following description of exemplary embodiments with reference to the attached drawings.

BRIEF DESCRIPTION OF THE DRAWINGS

FIG. 22A is a view for illustrating an example of a threshold matrix for tone reproduction of a normal AM screen when the smallest dot size is seven dots, and FIG. 22B is a view illustrating an example of a threshold matrix for a tone reproduction of a screen according to embodiments.

FIG. 23A is a view for illustrating an example of a threshold matrix for tone reproduction of a normal AM screen when the smallest dot size is five dots, and FIG. 23B is a view illustrating an example of a threshold matrix for a tone reproduction of a screen according to embodiments.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Image Forming Apparatus>

Figure 1:
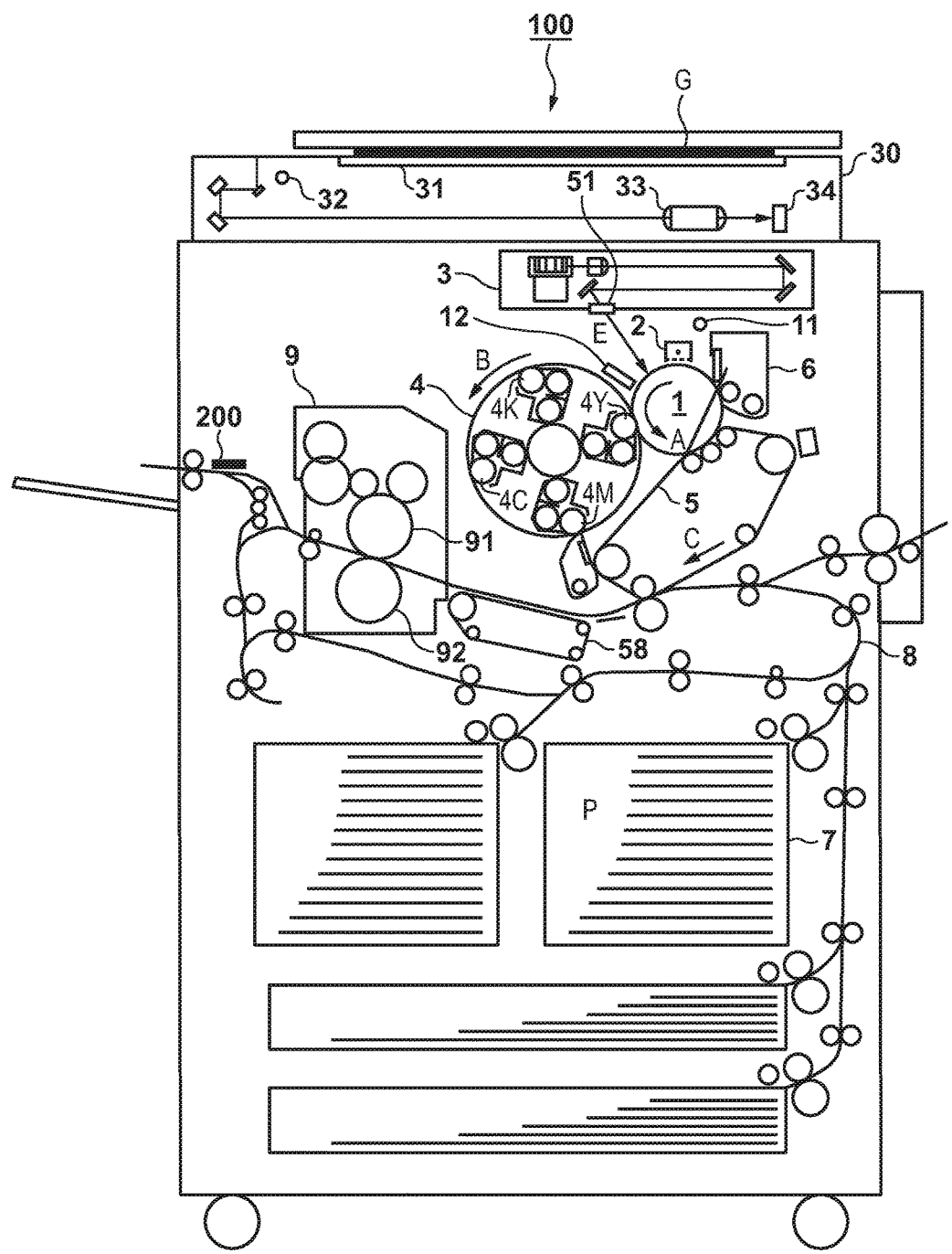
FIG. 1 is an overview cross-sectional view of an electrophotographic apparatus according to an embodiment.

Below, description will be given for a first embodiment of the present invention. FIG. 1 is a block diagram for describing a configuration of an image forming apparatus 100 according to the present embodiment.

In the image forming apparatus 100 illustrated in FIG. 1, reference numeral 1 indicates a photosensitive drum, reference numeral 2 indicates a charging apparatus (a corona charger in the present view), reference numeral 3 indicates an exposure apparatus (a scanner that uses a semiconductor laser in the present view), reference numeral 4 indicates an ink-jet method developer supply unit, and reference numeral 5 indicates a transfer unit. In addition, reference numeral 58 indicates a conveyance unit, reference numeral 6 indicates a cleaning apparatus, reference numeral 7 indicates a feed cassette, and reference numeral 9 indicates a fixing apparatus. Reference numeral 12 indicates a surface potential sensor, reference numeral 30 indicates an image reading apparatus, and reference numeral 200 indicates a color sensor.

A photosensitive layer of a photosensitive drum 1 contains at least a charge generating material and a charge transferring material. A phthalocyanine pigment, a polycyclic quinone pigment, an azo compound pigment, a perylene pigment, an indigo pigment, a quinacridone pigment, an azulenium dye, a squalium dye, a cyanine dye, a pyrylium dye, a thiopyrylium dye, or the like may be given as examples of a charge generating material. Furthermore, a xanthene colorant, a quinoneimine colorant, a triphenylmethane colorant, a styryl colorant, selenium, a selenium-tellurium alloy, amorphous silicon, cadmium sulfide, or the like may also be given. In addition, a pyrene compound, an N-alkylcarbazole compound, a hydrazone compound, an N,N-dialkylaniline compound, a diphenylamine compound, a triphenylamine compound, a triphenylmethane compound, or the like may be given as examples of a charge transferring material. In addition, a pyrazoline compound, a styryl compound, a stilbene compound, a polynitro compound, a polycyano compound, or the like may be given, and furthermore a pendant polymer or the like fixed onto the polymer of one of these compounds may be given.

A protective layer, a photosensitive layer, or the like is often formed by dispersing resin particles that contain fluorine atoms, the charge generating material, the charge transferring material, or the like respectively into a binding agent resin having affinity for deposition to cause them to be contained therein. A polyester, a polyurethane, a polyarylate, a polyethylene, a polystyrene, a polybutadiene, a polycarbonate, a polyamide, a polypropylene, a polyimide, a phenol resin, an acrylic resin, a silicone resin, or the like may be given as a corresponding binding agent resin. Furthermore, an epoxy resin, a urea resin, an aryl resin, an alkyd resin, a polyamidimide, a nylon, a polysulfone, a polyaryletherketone, a polyacetal, a butyral resin, or the like may also be given.

Description is given regarding a layer configuration of a photosensitive member of the image forming apparatus 100 according to the present embodiment. For a conductive support member, it is possible to use a metal such as iron, copper, gold, silver, aluminum, zinc, titanium, lead, nickel, tin, antimony, or indium, or an alloy thereof. Alternatively, for a conductive support member, it is possible to use a metal oxide, carbon, a conductive polymer, or the like. For the shape of the photosensitive member, it may be a drum shape that is cylindrical, columnar, or the like, a belt shape, or sheet-shaped. For the conductive material described above, there are cases where it is mold processed unchanged, cases where it is used as a coating, cases where it is vapor deposited, and cases where it is processed in accordance with etching or plasma treatment. In a case of coating, the aforementioned metal or alloy, or paper, plastic or the like is used as the support member.

A photosensitive layer may be a single layer configuration, or may be a stacked configuration. In the case of a stacked configuration, it is configured by at least a charge generation layer and a charge transfer layer, and a charging polarity, a toner polarity to use, or the like differ between a case where the charge generation layer is provided on a conductive support member side and a case where the charge transfer layer is provided on the conductive support member side. A thickness of the charge generation layer is 0.001 to 6 μm, and desirably 0.01 to 2 μm. It is desirable for a content percentage of the charge generating material included in a charge generation layer to be 10 to 100% by weight, and more desirably 50 to 100% by weight. The thickness of the charge transfer layer is result of subtracting the aforementioned thickness of the charge generation layer from the thickness of the photosensitive layer. It is desirable for content of a charge transferring material included in a charge transfer layer to be 20 to 80% by weight, and more desirably 30 to 70% by weight.

An undercoating layer may be provided between the conductive support member and the photosensitive layer. The undercoating layer functions as a charge injection control and adhesion layer at boundaries. The undercoating layer mainly comprises the binding agent resin, but it may include the metals or alloys described above, or an oxide, salt, surfactant, or the like thereof. A polyester, a polyurethane, a polyarylate, a polyethylene, a polystyrene, a polybutadiene, a polycarbonate, a polyamide, a polypropylene, a polyimide, a phenol resin, an acrylic resin, or the like may be given as examples of a binding agent resin for forming the undercoating layer. Furthermore, a silicone resin, an epoxy resin, a urea resin, an aryl resin, an alkyd resin, a polyamidimide, a polysulfone, a polyaryletherketone, a polyacetal, a butyral resin, or the like may also be given. It is desirable for the thickness to be 0.05 to 7 μm, and more desirable for the thickness to be 0.1 to 2 μm.

Methods such as vapor deposition or coating may be used as a method of manufacturing the photosensitive member according to the present embodiment. For a method in accordance with coating, films in a wide range from thin films to thick films and also various compositions can be formed. Specifically, coating is performed by a method such as using a bar coater, using a knife coater, immersion coating, spray coating, beam coating, electrostatic coating, using a roll coater, using an attritor, and powder coating. A coating used when coating a protective layer is prepared by causing resin particles containing fluorine atoms to be dispersed in the binding agent resin and the solvent. As a method of dispersion, a method using a ball mill, an ultrasonic wave, a paint shaker, a Red Devil™ shaker, or a sand mill may be used. It is also possible to use a similar method of dispersion in a case of a conductive fine powder or pigment or when the charge generating material is a pigment.

The photosensitive drum 1 in FIG. 1 is rotated at a predetermined circumferential speed in a direction of the arrow symbol A, centered on an axis. The photosensitive drum 1, in the process of its rotation, receives a uniform charge of a predetermined positive or negative electric potential on its circumferential surface in accordance with a charging apparatus 2, and subsequently receives optical image exposure E (a slit exposure, a laser beam scanning exposure, or the like) by an exposure apparatus 3 at an exposed portion. Because of this an electrostatic latent image corresponding to the exposure image is sequentially formed on the circumferential surface of the photosensitive member.

The image reading apparatus 30 is a unit for reading an original G placed on an original platen glass 31 and has a light source 32 that can move, and the light source irradiates an image surface of the original G, where the image surface is placed facing downward on the original platen glass. Light reflected from the image surface is read by a CCD 34 via a reflecting mirror, a lens 33, or the like, and the read image information is appropriately processed and inputted to the exposure apparatus 3.

The exposure apparatus 3 has a laser oscillator, a polygonal mirror, a lens, a reflecting mirror, or the like, and exposure light E from the exposure apparatus 3 is irradiated onto the photosensitive drum 1 via a dust proof glass unit 51. An electrostatic latent image is formed by exposing the surface of the photosensitive drum 1 in accordance with the image information inputted from the image reading apparatus 30 described above. In addition, in a case of being used as printer instead of a copying machine, processed image information is directly inputted to the exposure apparatus 3, and exposure of the photosensitive drum 1 is performed. Description is given using a scanning scanner as an exposure apparatus in the present embodiment, but a solid-state optical system such as an LED, OLED, or the like may also be used.

Description is given here regarding a series of image forming operations. An electrostatic latent image formed on the surface of the photosensitive drum 1 is developed as a toner image by toner being attached by developers of each color of yellow 4Y, magenta 4M, cyan 4C, and black 4K which are arranged in a developer supply unit 4. The developed toner is transferred to the transfer unit 5 for each color, and a four-color color image is formed. Meanwhile, a recording material contained in the sheet feed cassette 7 which is a sheet feeding and conveyance apparatus is fed by a feed roller and carried by conveyance rollers to a surface of the conveyance unit 58 which bridges over rollers. A color image formed by the transfer unit 5 as described above is transferred to the surface of the recording material that is on the conveyance belt 8. The recording material to which the toner image has been transferred is conveyed by the conveyance unit 58 to the fixing apparatus 9, and here the toner image is fixed by the surface by being heated and pressurized by a fixing roller 91 and a pressure roller 92, and subsequently the recording material is discharged onto a sheet discharge tray 10.

<Two-Component Developer>

Here, description is given regarding a two-component developer used in the present embodiment. A two-component developer is configured with a nonmagnetic toner and a low magnetization and high resistance carrier as principal components. The nonmagnetic toner is configured by employing an appropriate amount of a binder resin such as a styrene resin, a polyester resin, or the like, a colorant such as carbon black, a dye or pigment, a release agent such as a wax, a charge-controlling agent and the like. Such a nonmagnetic toner can be manufactured by a method such as a pulverization method or a polymerization method. Note that, for the nonmagnetic toner (negative chargeability), a frictional charge amount of approximately $-1\times10^{-2}$ to $5.0\times10^{-2}$ C/Kg is desirable. If the frictional charge amount of the nonmagnetic toner deviates from this range, there are cases where a counter charge amount that occurs in the magnetic carrier increases, with an unprinted portion level worsening to cause an image defect. The frictional charge amount of the nonmagnetic toner may be adjusted in accordance with, for example, a type of material used, and may be adjusted by the addition of an additive agent. The frictional charge amount of the nonmagnetic toner can be measured by using a typical blowoff method where an approximately 0.5 to 1.5 g amount of the developer is taken, toner is suctioned from the developer by air suction, and a charge amount induced by a measurement container is measured.

In addition, it is possible to use something publicly known for the magnetic carrier. For example, a resin carrier formed by dispersing, in resin, magnetite as a magnetic material and dispersing carbon black for conductivity and resistance adjustment, may also be used. In addition, something that has been subject to resistance adjustment where the surface of magnetite such as ferrite on its own is subject to oxidation and reduction processing may be used. In addition, something that has been subject to resistance adjustment where the surface of magnetite such as ferrite on its own is coated by a resin may be used. A method of manufacturing these magnetic carriers is not particularly limited.

Note that it is desirable that the magnetic carrier has magnetization of $3.0 \times 10^4$ A/m to $2.0 \times 10^5$ A/m in a magnetic field of 0.1 T. When the magnetization amount of the magnetic carrier is reduced, there is an effect for suppressing scavenging due to a magnetic brush, but adhesion to the non-magnetic cylindrical body by a magnetic field generation unit becomes difficult, and there are cases where an image defect such as magnetic carrier adhesion to the photosensitive drum or an image defect such as a sweep out texture occurs. In addition, when the magnetization of the magnetic carrier is greater than the above range, there are cases where an image defect occurs due to the pressure of the magnetic brush as described above.

Furthermore, for the volume resistivity of the magnetic carrier, considering leakage and developability, using something in the range of $10^7$ to $10^{14}$ Ωcm is desirable. The magnetization of a carrier is measured using BHV-30 which is a vibration magnetic field type magnetic property automatic recording apparatus manufactured by Riken Denshi Co. Ltd. For a magnetic property value of carrier powder, a 0.1 T external magnetic field is made, and the strength of magnetization at that time is obtained. The carrier is in a packed state so as to be sufficiently close to a cylindrical plastic container. The magnetization moment in this state is measured, the actual weight at the time when the sample has been placed is measured, and the strength of the magnetization is obtained (AM2/Kg). Next, the true specific gravity of a carrier particle is obtained by a dry type automatic density form AccuPyc (manufactured by Shimadzu Corporation), and by multiplying the strength of the magnetization (AM2/Kg) by the true specific gravity, it is possible to obtain the strength of the magnetization per unit volume (A/m) which is used in the present embodiment.

<Development Bias>

Figure 3A:
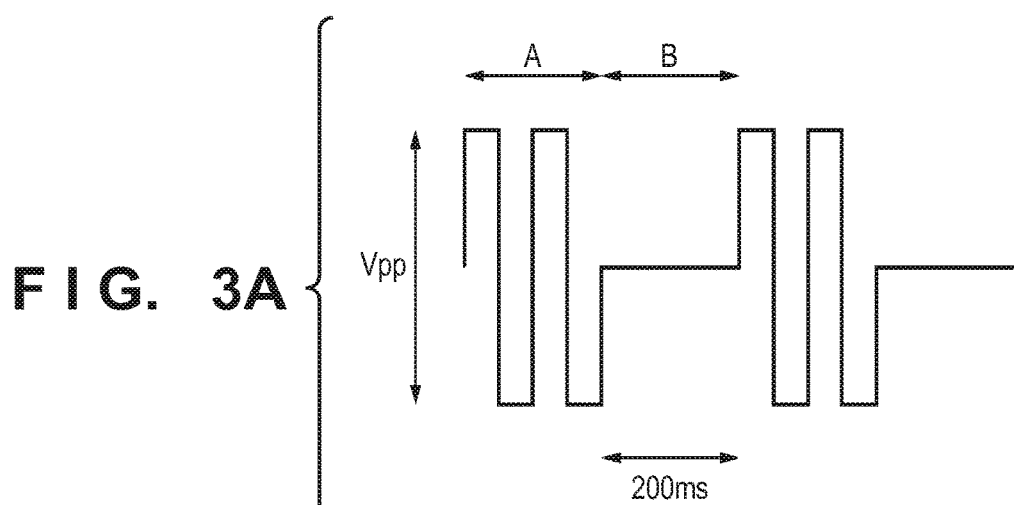
FIGS. 3A through 3C are schematic views of an exposure light source used, according to an embodiment.
Figure 3B:
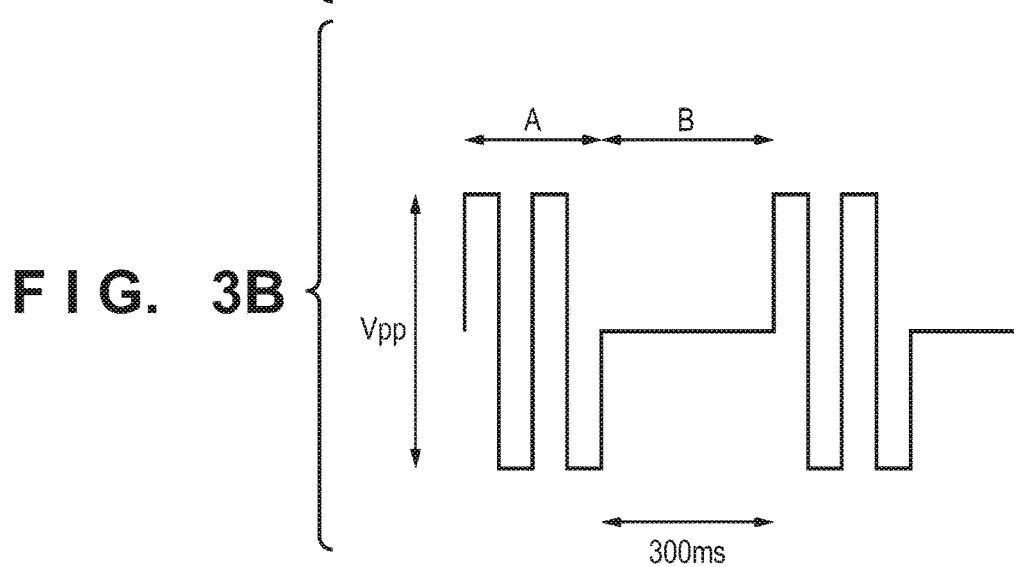
Figure 3C:
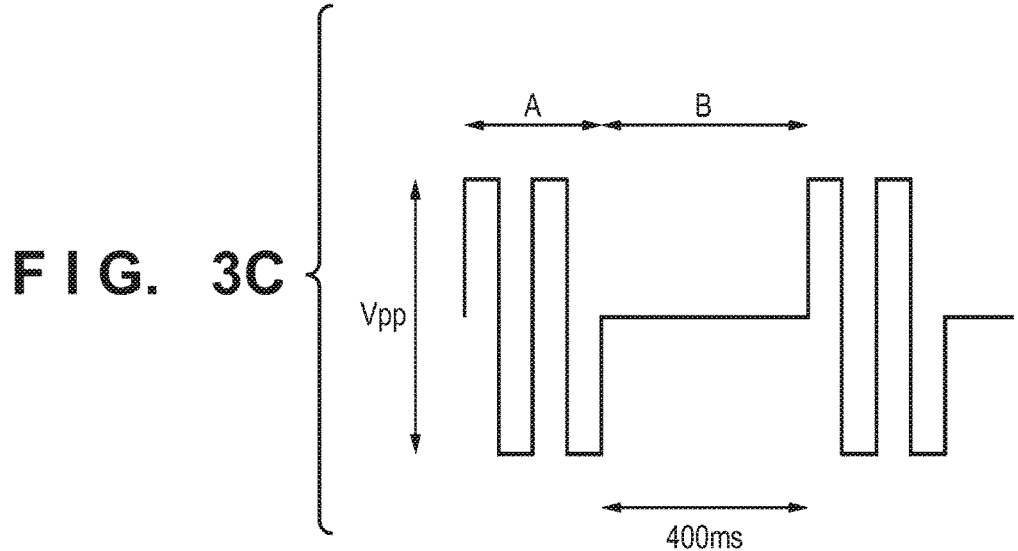

Next, with reference to FIG. 3A through FIG. 3C, description is given regarding a development bias applied to a developing sleeve according to the present embodiment. In FIG. 3A through FIG. 3C, the abscissa indicates time and the ordinate indicates voltage. FIG. 3A indicates a time waveform for an alternative current component of a development bias that is applied to a developing sleeve. As illustrated by FIG. 3A, in the present embodiment, a waveform that overlaps an alternating-current voltage and a direct-current voltage is used. A total of a section (amplitude portion) A for overlapping and applying the alternating-current voltage and the direct-current voltage and subsequently a section (blank time) B for applying only the direct-current voltage is taken as one cycle, and this cycle is the repeating bias (hereinafter referred to as a blank pulse bias).

An amplitude portion A has a frequency of 15 kHz, and the time required for one cycle is 100 ms, and because this is repeated for two cycles, the amplitude portion A is applied over 200 ms. The blank time B is also applied over 200 ms. An amplitude value width Vpp of the alternating-current voltage is set to 1.8 kV at an initial state. The image forming apparatus 100 has a control circuit (not shown) for controlling the development bias applied to the developing sleeve. In addition, the blank time B may be 300 ms or 400 ms as illustrated by FIG. 3B or FIG. 3C.

<Control Configuration of Image Forming Apparatus>

Figure 4:
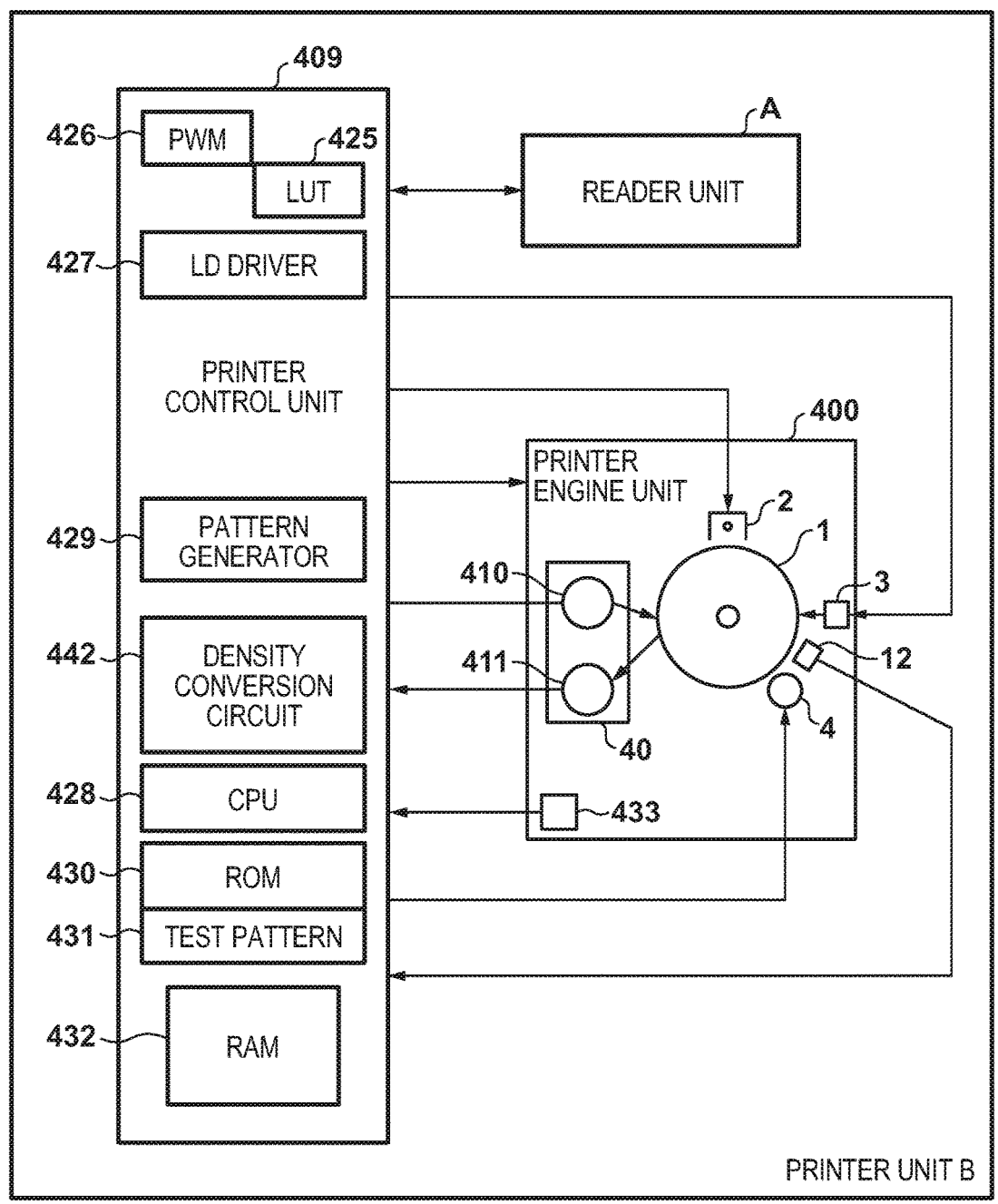
FIG. 4 is a control block view according to an embodiment.

Next, with reference to FIG. 4, description is given regarding an example of a control configuration of the image forming apparatus 100 according to the present embodiment, in particular a control configuration for image adjustment by a printer unit B. A printer control unit 409 includes a CPU 428, a ROM 430, a RAM 432, a test pattern storage unit 431, a density conversion circuit 442, an LUT 425, an LD driver 427, a pattern generator 429, and a PWM circuit 426. In addition, the printer control unit 409 is connected so as to be able to communicate with a reader unit A and a printer engine unit 400.

The printer engine unit 400 controls an optical reading apparatus 40 comprising an LED 410 and a photodiode 411, the charging apparatus 2, a laser 101, the surface potential sensor 12, and the developer supply unit 4 which are arranged around the photosensitive drum 1. In addition, an environment sensor 433 for measuring moisture content in air in the apparatus is provided, is controlled by the printer engine unit 400, and an output signal from this sensor is inputted to the printer control unit 409. As illustrated by FIG. 4, the surface potential sensor 12 is provided more on an upstream side in the rotation direction of the photosensitive drum 1 than the developer supply unit 4, and a grid potential of the charging apparatus 2 and the development bias of the developer supply unit 4 are controlled by the CPU 428 as is described later.

<Image Signal Processing>

Figure 5:
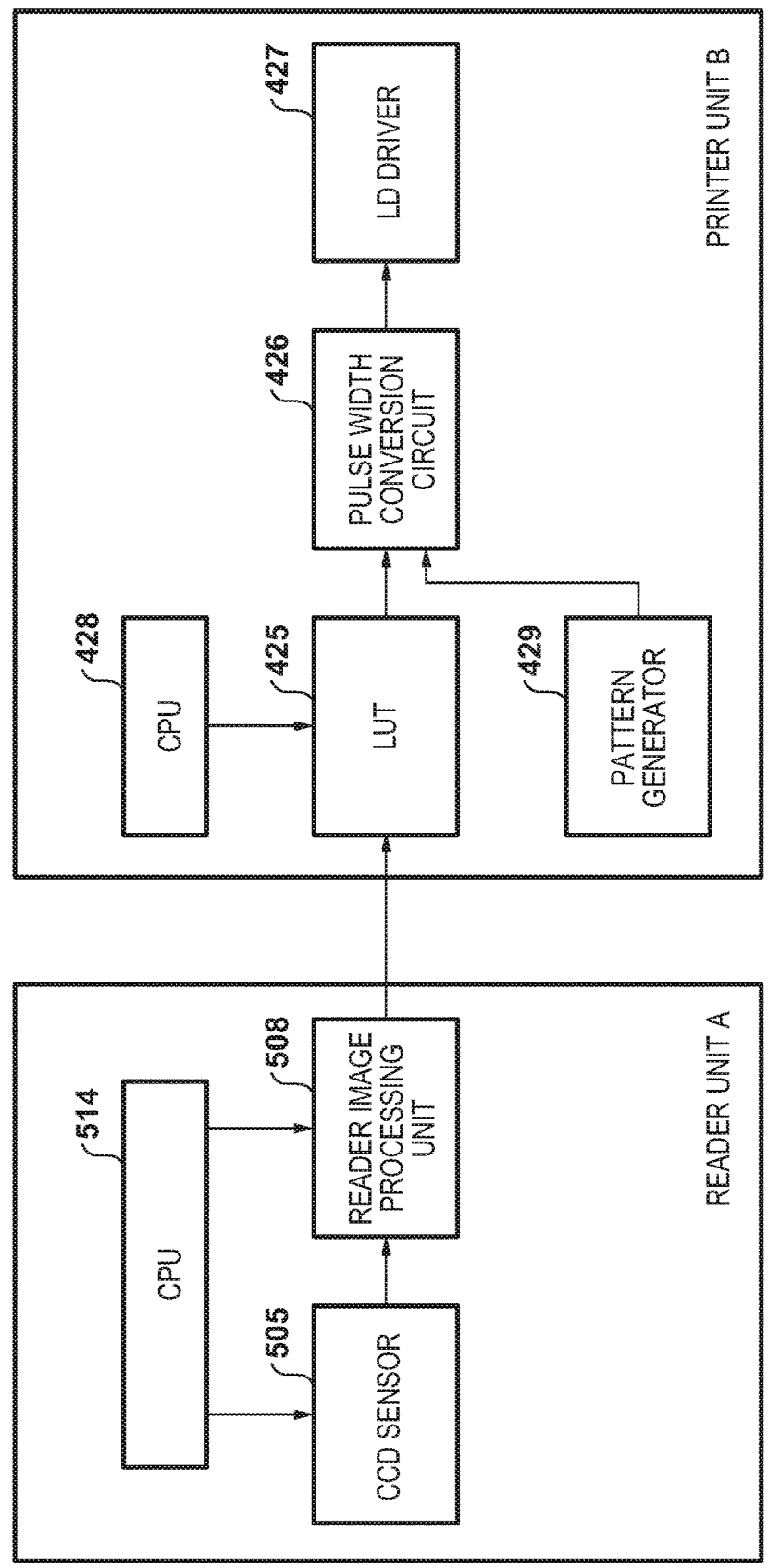
FIG. 5 is a block diagram of tone control according to an embodiment.

Next, with reference to FIG. 5, description is given regarding a processing configuration of image signal processing for obtaining a tone image according to the present embodiment. As illustrated by FIG. 5, the same reference numerals are added to the same configuration as the configuration of FIG. 4. The reader unit A comprises a CPU 514, a CCD sensor 505, and a reader image processing unit 508. The CPU 514 controls the CCD sensor 505 and the reader image processing unit 508.

A luminance signal of an image is obtained by the CCD sensor 505 and inputted to the reader image processing unit 508. The reader image processing unit 508 converts the inputted luminance signal of the image to a surface-sequential image signal. The converted image signal is inputted to the LUT (lookup table) 425 of the printer unit B. In the LUT 425, for the image signal, density characteristics are converted so that the density of the source image matches the density of the output image, the density characteristics being the γ characteristic of the printer at a time of an initial setting, which is represented by the inputted image signal. The image signal for which the density characteristics were converted is inputted to the pulse width modulation (PWM) circuit 426.

Figure 6:
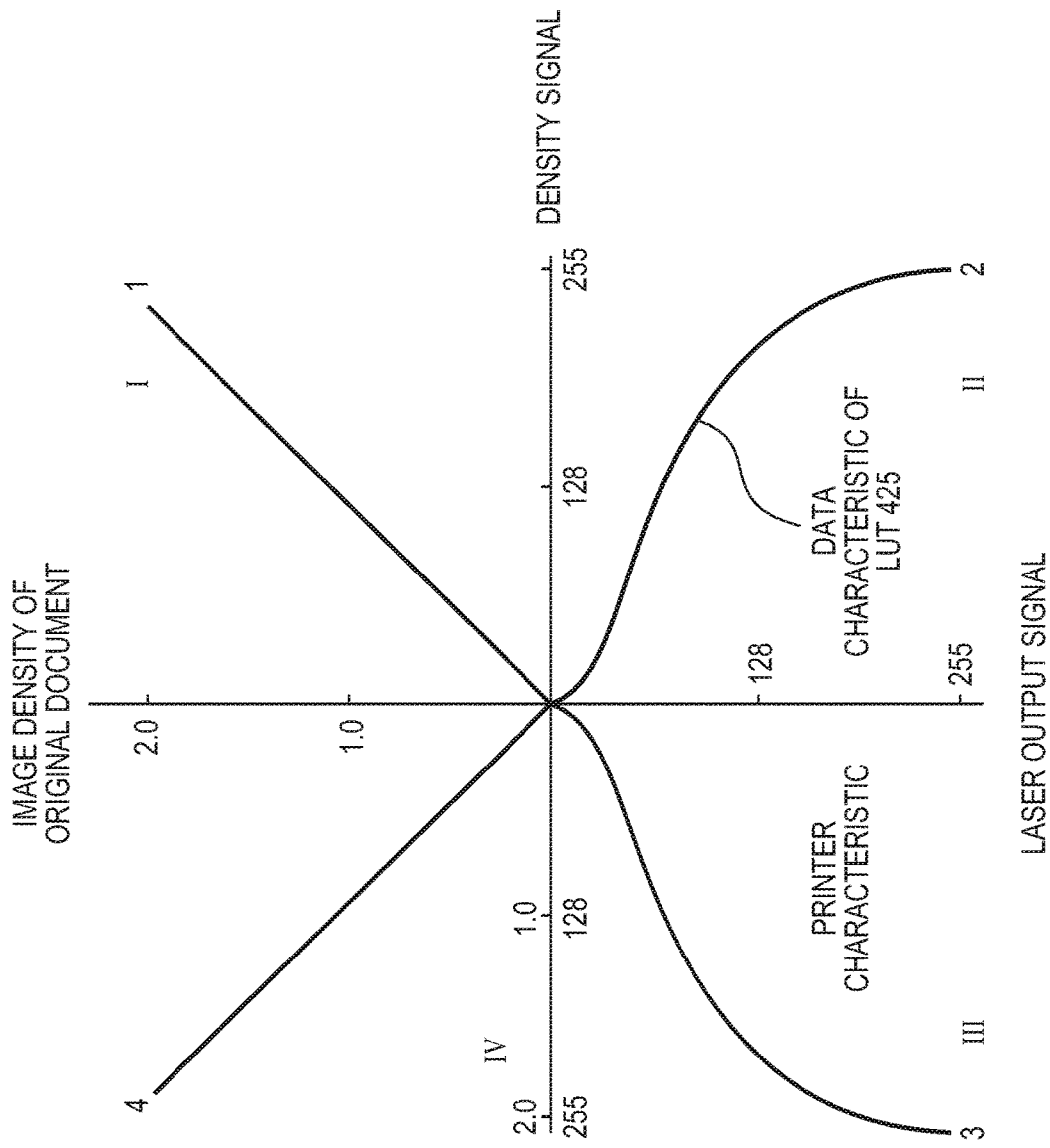
FIG. 6 is a four quadrant chart view illustrating a tone reproduction characteristic according to an embodiment.

Here, with reference to FIG. 6, a four-quadrant chart is used to describe tone reproduction characteristics. In FIG. 6, the abscissa indicates a density signal, and the ordinate indicates an image density of original document in an upward direction, and illustrates a laser output signal in a downward direction. Quadrant I indicates a reading characteristic of the reader unit A which converts the image density of original document to a density signal. Quadrant II illustrates a conversion characteristic of the LUT 425 which is for converting a density signal into a laser output signal. Quadrant III indicates a recording characteristic of the printer unit B for converting a laser output signal into an output density. Quadrant IV indicates a total tone reproduction characteristic of the image forming apparatus, indicating a relationship of an output density from an image density of original document. The tonal number is 256 tones because processing is done with an 8-bit digital signal. In this image forming apparatus, a portion of quadrant III where the printer characteristic is not linear is corrected by the LUT 425 of the quadrant IV so that the tone characteristic of the quadrant IV becomes linear. The LUT 425 is generated in accordance with a computation result that is described later.

The description returns to FIG. 5. After being subject to a density conversion by the LUT 425, a signal from the PWM circuit 426 is converted into a signal that corresponds to a dot width, and sent to the LD driver 427 which controls ON/OFF of a laser. In the present embodiment, a tone reproduction method in accordance with pulse width modulation processing is used for all of the colors for Y, M, C, and K. A latent image having predetermined tone characteristics is formed, in accordance with change of dot area, on the photosensitive drum 1 in accordance with scanning of the exposure apparatus (laser) 3, and a tone image is reproduced after the processes of development, transfer, and fixing.

<Automatic Tone Correction>

Description is given below regarding a processing procedure for an automatic tone correction regarding stabilization of image reproduction characteristics of a system that includes both of the reader unit A and the printer unit B. Firstly, with reference to FIG. 7, description is given regarding a calibration of the printer unit B that uses the reader unit A. Processing of this flowchart is realized by the CPU 514 controlling the reader unit A, and the CPU 428 controlling the printer unit B. This control is started by a mode setting button referred to as an automatic tone correction that executes processing for adjusting an image forming condition being pressed, the button provided on an operation unit of the image forming apparatus 100. In other words, it is assumed that this processing is started with a user instruction as a trigger.

In step S51, the CPU 428 of the printer unit B displays a print start button for a test print 1 on a display unit of the operation unit. When the print start button is pressed by a user, the CPU 428 prints an image of the test print 1 illustrated by FIG. 8 on a recording material such as a sheet. At a time of forming the test print 1, for a contrast potential (described later), something for a standard state in accordance with the environment is registered as an initial value thereof, and the printer unit B uses the registered value.

Figure 8:
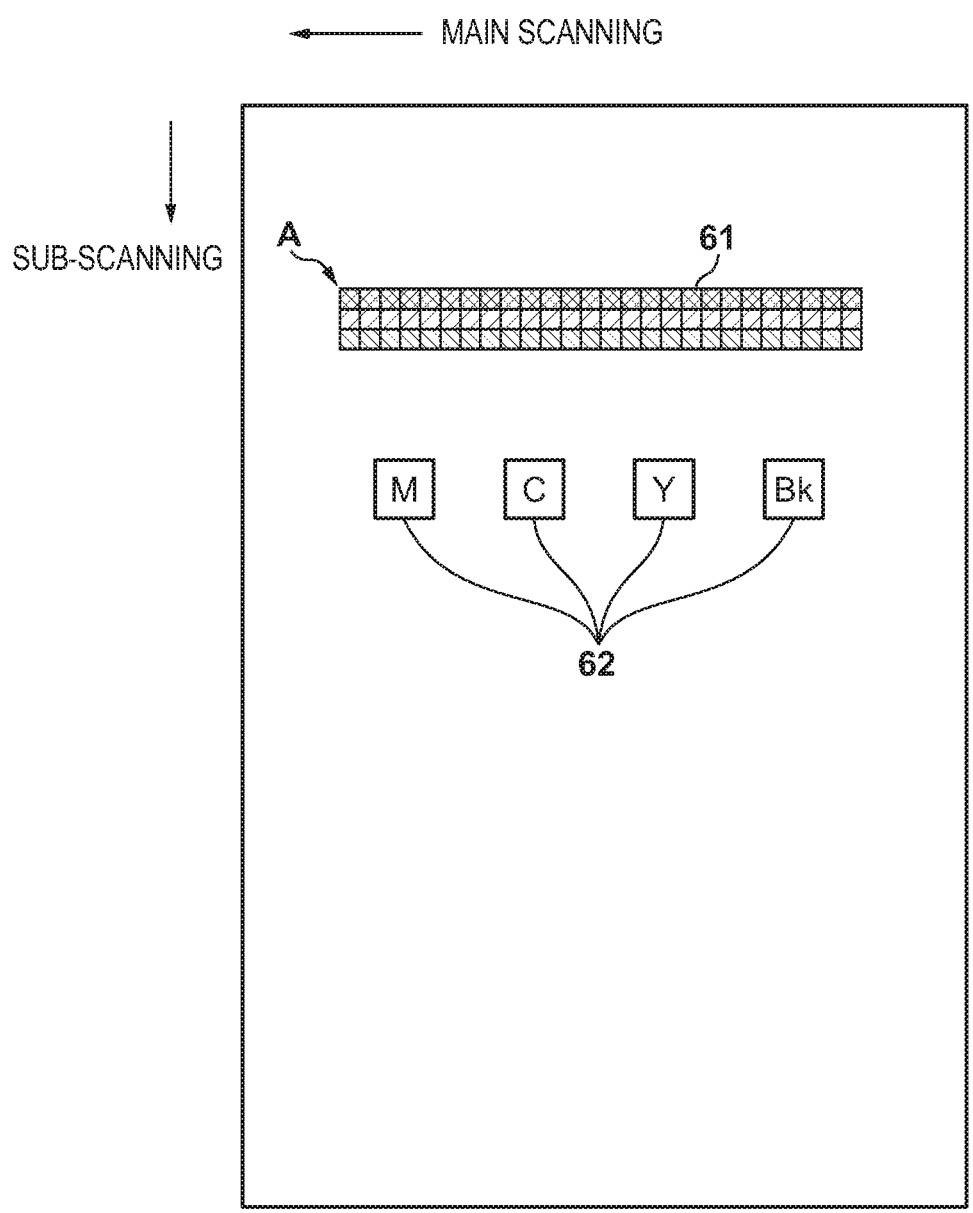
FIG. 8 is a view for illustrating an example of a test print 1 according to an embodiment.
Figure 9:
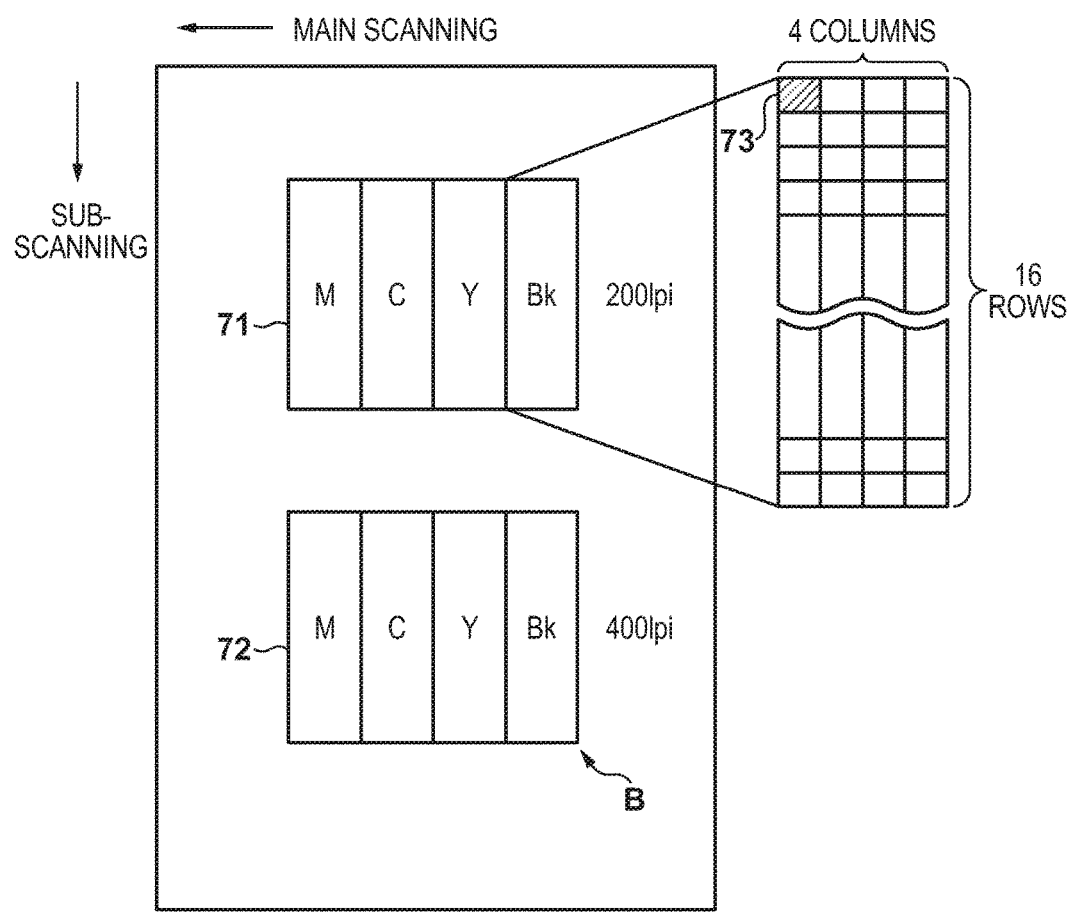
FIG. 9 is a view for illustrating an example of a test print 2 according to an embodiment.

Here, with reference to FIG. 8 and FIG. 9, description is given regarding the test pattern. FIG. 8 illustrates an example of the test print 1, and FIG. 9 illustrates an example of a test print 2. The test pattern 1 includes a strip-shaped pattern 61 in accordance with halftone densities for the four colors Y, M, C, and K. A user confirms that there is no stripe-like abnormal image, density unevenness, or color inconsistency by visually inspecting the pattern 61. For these patterns, the size in the direction of main scanning by the CCD sensor 505 is set in a thrust direction so as to cover patch patterns 62 illustrated in FIG. 8 and tone patterns 71 and 72 illustrated in FIG. 9. Note that, the patterns 62 are maximum density patches for the colors of Y, M, C, Bk, and 255 levels are used for density signal values.

Figure 7:
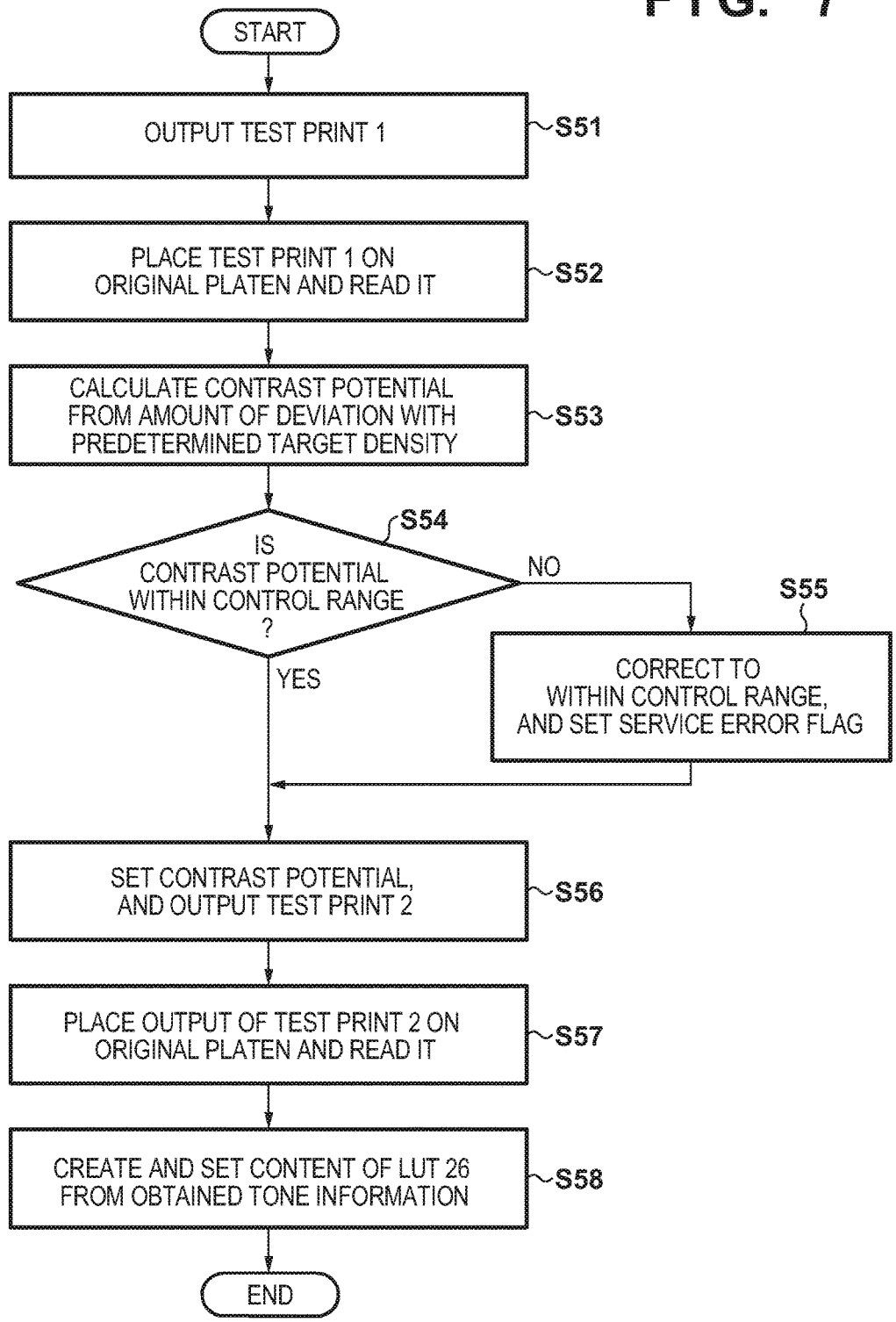
FIG. 7 is a flow diagram for a first control system according to an embodiment.

The description of FIG. 7 is returned to. In step S51, when a user places a sheet on which a test pattern is printed on an original platen and presses a read start button shown on the display unit, in step S52 the CPU 514 of the reader unit A reads an image of the test print 1 from the sheet and the processing proceeds to step S53.

Figure 10:
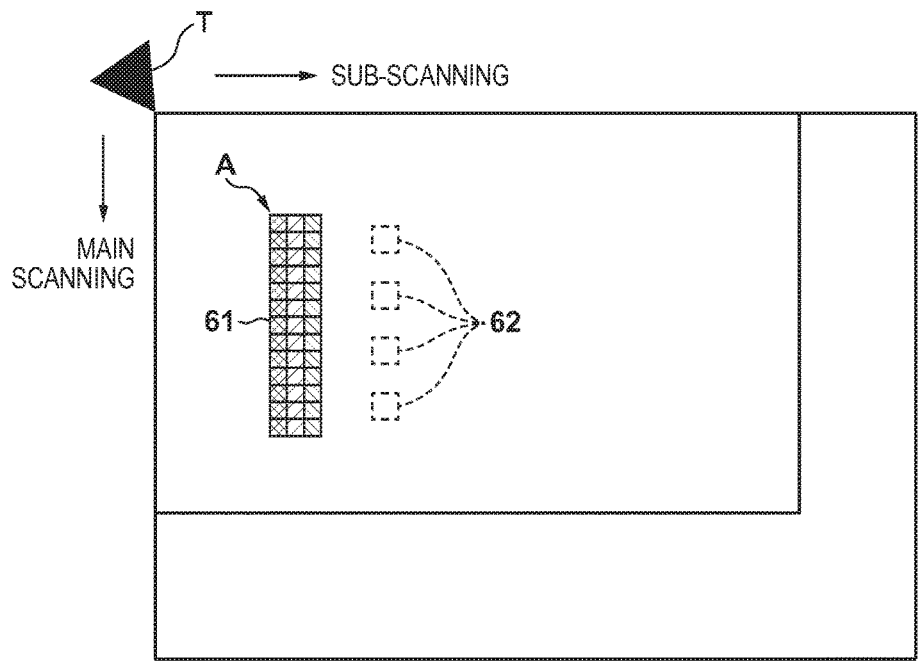
FIG. 10 is a view for illustrating how to place the test print 1 on an original platen according to an embodiment.

FIG. 10 is a view from a perspective of above the original platen, where a wedge mark T on the top-left is a mark on the original platen for abutting against the original, and it is necessary to place a sheet so that the strip-shaped pattern 61 is set on a side of the wedge mark T, and also so the front and back are not mistaken. Consequently, it is desirable that the CPU 428 displays, on the display unit of the operation panel, a message that designates an orientation and position of a sheet as described above in order to cause the sheet to be placed at a position that enables the reader unit A to detect the test pattern. Because of this it is possible to prevent a control error due to a placing mistake. At a time of reading the patterns 62 by the reader unit A, scanning is gradually performed from the wedge mark T, and a first density gap point A is obtained at a corner of the pattern 61. Consequently, from the coordinate point thereof, the CPU 428 derives the position of each patch of the patterns 62 by relative coordinates, and reads the density values of the patterns 62.

The following Equation (1) is used to make a conversion to an optical density from the obtained RGB values. In Equation (1), adjustment by a correction coefficient (k) is performed in order to achieve the same value as a commercial densitometer.

[EQUATION 1]

$$M = -\mathrm{km} \times \log^{10}\left(\frac{G}{255}\right), C = -kc \times \log^{10}\left(\frac{R}{255}\right),$$
$$Y = -ky \times \log^{10}\left(\frac{B}{255}\right), Bk = -kbk \times \log^{10}\left(\frac{B}{255}\right) \quad (1)$$

Next, description is given for a method of correcting a maximum density from the obtained density information. A case is envisioned where the difference between a developing potential and a surface potential of the photosensitive drum when hit with a maximum level using a laser beam after being primary charged is a maximum density DA obtained by a setting referred to as a contrast potential A. In such a case, in a density range of the maximum density, normally an image density linearly corresponds to a relative drum surface potential. However, in a two-component development system, in a case where toner density in the developer fluctuates and has decreased, there are cases where a non-linear characteristic will be achieved in a density range of the maximum density. Consequently, although a target value for a final maximum density is given as 1.6, anticipating a margin of 0.1, the control amount is decided by setting 1.7 as the target value for control that matches the maximum density.

A contrast potential B is obtained using the following Equation (2).

$$B = (A + Ka) \times 1.7 / DA \quad (2)$$

The Ka here is a correction coefficient, and it is desirable to optimize its value in accordance with a type of a development method. In practice, with an electronic photographic method, depending on the environment, because the image density will not match if a setting of the contrast potential A is not changed in accordance with the environment, it is necessary to change the setting in accordance with output of the environment sensor 433 which monitors the moisture content in the apparatus as described above.

Consequently, as a method for correcting the contrast potential, a correction coefficient Vcont.rate1 of the following equation (3) is saved in the RAM 432 in advance.

$$V\text{cont.rate1} = B/A \quad (3)$$

Every 30 minutes the image forming apparatus monitors fluctuation of the environment (the moisture content), and each time the value of A is decided based on a detection result, A×Vcont.rate1 is calculated to obtain the contrast potential.

The description of FIG. 7 is returned to. In step S53, the CPU 428 obtains a contrast potential so that the maximum density is 0.1 higher than the final target value, and sets the grid potential and the developing potential so that this contrast potential can be achieved. Next, in step S54, the CPU 428 determines whether the obtained contrast potential is in a control range. If it deviates from the control range, the processing proceeds to step S55, and the CPU 428 determines that there is an abnormality with the developer or the like, and sets an error flag that can be checked by a service person so that the developer of a corresponding color is checked. The service person can check the error flag in a predetermined service mode. Furthermore, at a time of such an abnormality, the CPU 428 modifies the contrast potential to be a value just inside the control range, and advances the processing to step S56 so that control continues. In the processing thus far, setting of the grid potential and the developing potential is performed by the CPU 428 so as to achieve the contrast potential obtained in step S53.

Next, the CPU 428 displays on the display unit on the operation panel a print start button for an image of the test print 2. When a user presses the button, in step S56, the CPU 428 prints the image of the test print 2 which is illustrated on FIG. 9. As illustrated by FIG. 9, the test print 2 is configured by patch groups (tone patterns 71 and 72) of gradations for 64 tones in the entirety of 4 columns and 16 rows for each color of Y, M, C, Bk. Here, for each set of 64 tones out of the entirety of 256 tones, a laser output level is predominantly allocated to regions having low density, for the laser output level is thinned for a high density region. If configuration is taken in this way, it is possible to make satisfactory adjustment of tone characteristics, especially in a highlight portion.

In FIG. 9, the tone pattern 71 is patches having a resolution of 200 lpi (lines/inch), and the tone pattern 72 is patches having a resolution of 400 (lines/inch). It is possible to realize formation of an image for each resolution by preparing, in the PWM circuit 426, a plurality of cycles of triangle waves used in a comparison with image data that is the target of processing. Note that, in the present embodiment, a tone image is created at a resolution of 200 lpi, and line image such as text is created at a resolution of 400 lpi. Patterns having the same tone levels at two types of resolutions are outputted, but it is desirable to set the tone level first in accordance with the resolution in a case where the tone characteristics differ greatly due to difference in resolution. In addition, the test print 2 is caused to be generated from the pattern generator 429 without applying the LUT 425.

Figure 11:
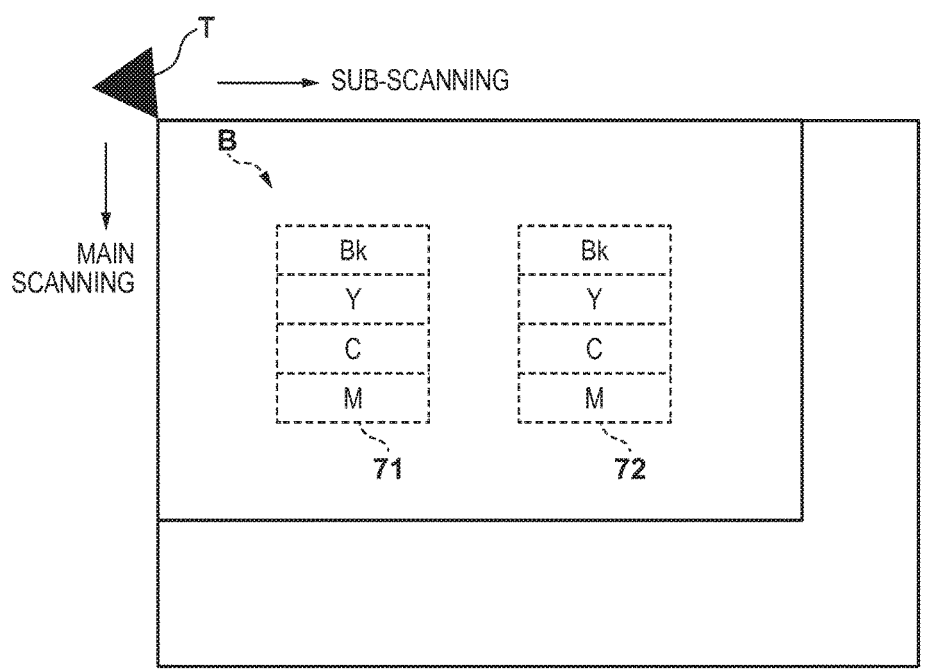
FIG. 11 is a view for illustrating how to place the test print 2 on an original platen according to an embodiment.

In step S57, the CPU 514 reads output of the test print 2 which has been placed on the original platen by a user. FIG. 11 is a pattern diagram seen from above when output of the test print 2 is placed on the original platen glass 31. The wedge mark T on the top-left is a mark for abutting the original to the original platen, and is placed so that the Bk pattern is on a side of the abut mark T. Consequently, it is desirable that the CPU 428 displays, on the display unit of the operation panel, a message to the effect of designating an orientation and position of a sheet as described above in order to cause the sheet to be placed at a position that enables the reader unit A to detect the test pattern. In such a case, when the pattern is read by the reader unit A, because scanning is gradually performed from the wedge mark T and a first density gap point B is obtained, it is possible to infer, from the coordinate point thereof, the position of each color patch of the pattern, at relative coordinates. As indicated by reference numeral 73 of FIG. 9, there are 16 points read for one patch, and obtained signals are averaged. It is desirable to optimize the number of points in accordance with a usage environment or a specification of the image forming apparatus or the reading apparatus.

Figure 12:
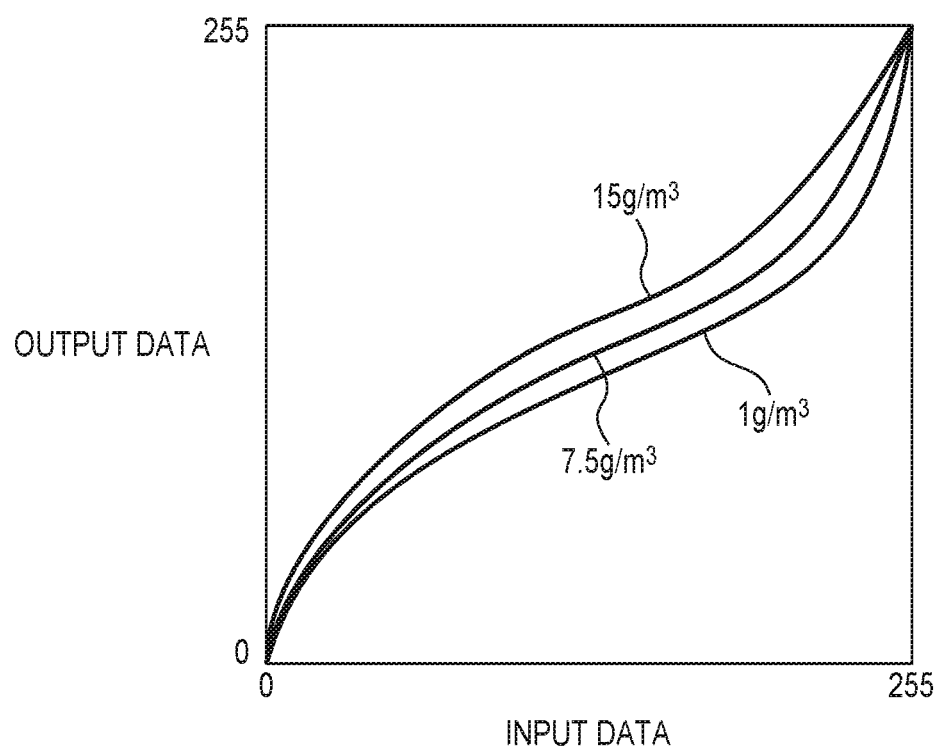
FIG. 12 is a view for illustrating an LUT corresponding to respective moisture content, according to an embodiment.

FIG. 12 illustrates on the ordinate an RGB signal that is obtained by averaging the values of 16 points for each patch and is corrected to a density value in accordance with a method of converting the RGB signal into an optical density illustrated earlier and set as an output density (output data), and illustrates on the abscissa a laser output level (input data). Furthermore, with a zero level set to a base density of paper, which is 0.08 here, 1.60 that is set to the maximum density of the image forming apparatus is normalized to a 255 level. In a case where obtained data has a density that has become specifically high or specifically low, there is a possibility that there is dirt on the original platen glass 31, or that there is a defect on the test pattern. Accordingly, correction is performed by applying a limiter to tilt so that continuity is preserved in a data sequence. Specifically, when tilt is three or more, it is fixed at three, and a time of a negative value is set to a density level that is the same as a previous level.

In step S58, the CPU 428 creates and sets the content of the LUT 425 from the obtained tone information. The content of the LUT 425 can be simply created by merely swapping coordinates for a density level illustrated in FIG. 12 as an input level (the density signal axis of FIG. 6) to coordinates of a laser output level taken as an output level (the laser output signal axis of FIG. 6). For a density level that does not correspond to a patch, a value is obtained by an interpolation calculation. In such a case, a restriction condition is provided so that the output level becomes 0 level for an input level at the 0 level. By the above processing, creation of a γ conversion table and contrast potential control in accordance with a first control system that uses a reading apparatus completes.

<Halftone Reproduction>

Figures 13A, 13B, 13C:
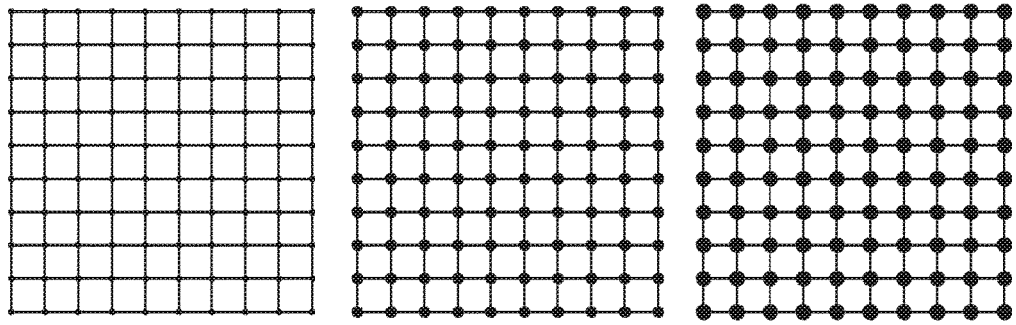
FIGS. 13A through 13C are views for illustrating examples of halftone dot patterns having differing densities in normal AM screening.

Next, with reference to FIG. 13A through FIG. 13C and FIG. 14A through FIG. 14C, description is given regarding a halftone representation that uses AM screening (Amplitude Modulated Screening). FIGS. 13A through 13C are views for describing halftone dots used in tone reproduction of normal AM screening. Each dot in AM screening has an arbitrary shape such as a circle, an elliptical shape, a square, or a rectangle, and represents tone by area modulation for changing the dot size in accordance with density. Consequently, in FIGS. 13A through 13C, the density is in an order of FIG. 13A<FIG. 13B<FIG. 13C, and the dot size increases in an order of FIG. 13A<FIG. 13B<FIG. 13C together with density. In addition, the sizes of the respective dots in FIGS. 13A through 13C are the same.

In contrast to this, in this embodiment, screening for halftone reproduction uses conventional AM screening in a density range of approximately 10% or more CMYK (a region other than a highlight region). In addition, the size of dots for forming screening of a highlight region of approximately 20% CMYK or less is fixed. Furthermore, in the highlight region, instead of performing a tone representation by dot size as in a conventional AM screening, configuration is taken so as to perform a tone representation by a number of dots as illustrated by FIGS. 14A and 14B.

Figures 14A, 14B, 14C:
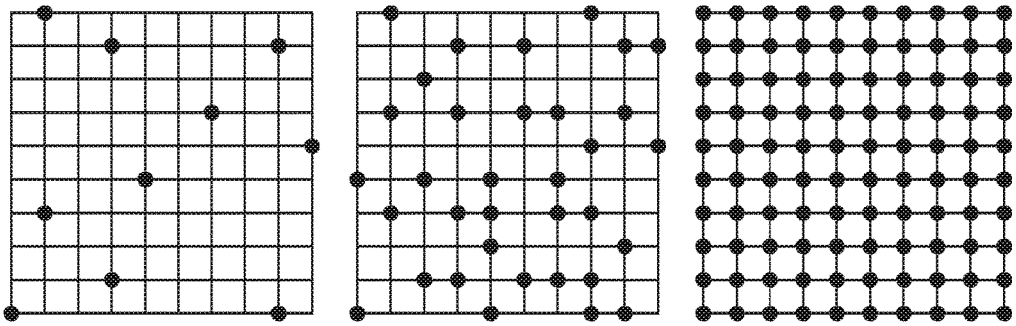
FIGS. 14A through 14C are views illustrating examples of halftone dot patterns having differing densities for screens for which a smallest dot size is defined, according to an embodiment.

FIGS. 14A through 14C are views illustrating screening for defining halftone dots used in tone reproduction in the image forming apparatus 100 according to embodiments, and illustrate examples of halftone dot patterns for respectively different densities. A tone representation is performed by a number of dots in a highlight region, as in FIGS. 14A and 14B. For a region whose density is higher than a density range (FIG. 14C) where fixed size dots are arranged for all halftone dot growth points, screening that represents the tone by increasing dot size, the same as conventional AM screening, is used.

Figures 17, 18:
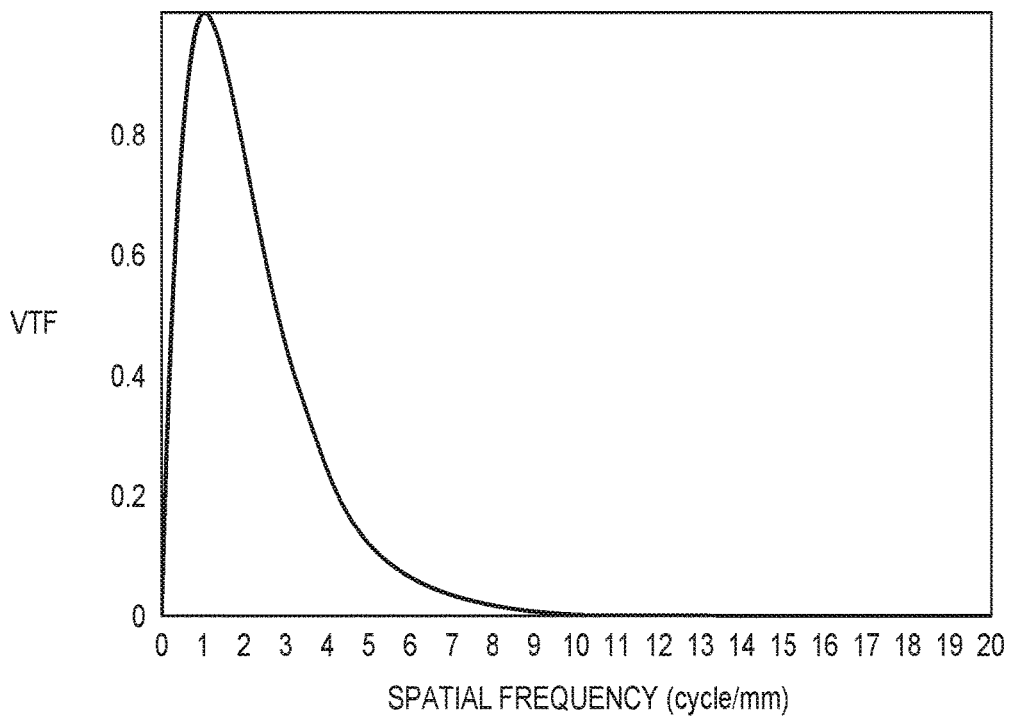
FIG. 17 is a view for illustrating image evaluation results according to differences in smallest dot size, according to an embodiment.
FIG. 18 is an explanatory view for conceptually illustrating a spatial frequency characteristic VTF for vision.

FIG. 18 is an explanatory view conceptually illustrating a spatial frequency characteristic VTF (Visual Transfer Function) at a visual viewing distance of 300 mm which is a sensitivity characteristic with respect to a spatial frequency of a human visual sense. A representative experimental equation that represents a visual spatial frequency characteristic VTF is illustrated below.

[EQUATION 4]

$$VTF(u) = 5.05 \cdot \exp\left(\frac{(-0.138 \cdot \pi \cdot L \cdot u)}{180}\right) \cdot \left\{1 - \exp\left(\frac{(-0.138 \cdot \pi \cdot L \cdot u)}{180}\right)\right\} \quad (4)$$

A variable L of Equation (4) represents a viewing distance, and a variable u represents a spatial frequency.

In the present embodiment, granularity is calculated by the following method in order to evaluate graininess. As a method of calculating granularity, Dooley and Shaw of Xerox Corporation apply a Wiener spectrum to graininess measurement. Furthermore, they propose a method for, after performing a cascade with a visual spatial frequency characteristic (Visual Transfer Function: VTF), setting an integrated value as a granularity (GS).

[EQUATION 5]

$$GS = \exp(-1.8\overline{D}) \int \sqrt{WS(u)} \cdot VTF(u) du \quad (5)$$

Here, u is a spatial frequency, WS(u) is a Wiener spectrum, and VTF(u) is a visual spatial frequency characteristic. The term of $\exp(-1.8\overline{D})$ is a function for correcting a difference between brightness that a person perceives and density, in which average density D is a variable.

The method of calculating granularity according to embodiments is based on the foregoing Equation (5) of Dooley et. al. that uses a Wiener spectrum and a VTF, and allows for application development. By making the dot size large and stable in order to improve the granularity, it is possible to suppress the granularity to be low, and in addition the reproducibility of halftone dots is related to GS, and it is possible to suppress the granularity to be low if the reproducibility of halftone dots is high.

However, when the size of halftone dots is large, the dot pattern itself is recognized and print quality is damaged, and so it is desirable to set halftone dots to be as small as possible. In addition, when a smallest dot size is set large, the density is represented by a number of halftone dots, but there is a problem in that a screen pattern is perceived visually when the dots are regularly arranged the same as in normal AM screening. Accordingly, when representing the tone by only the smallest dots as illustrated by FIGS. 14A and 14B, a method for selecting dots at random from growth point dots of the AM screening is employed.

Figure 15:
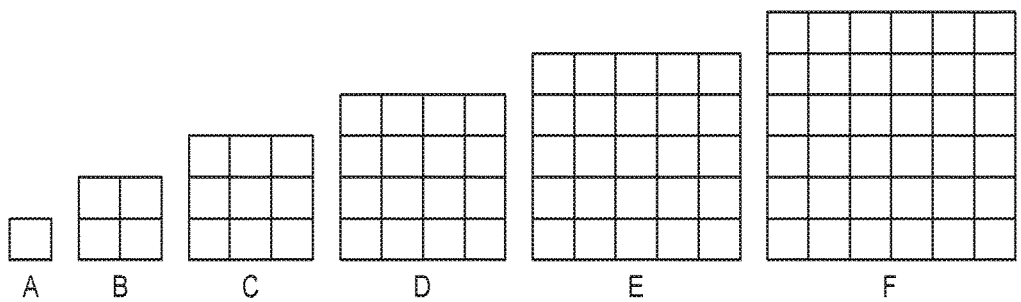
FIG. 15 is a pattern diagram for smallest dots of screens, according to an embodiment.

The resolution of the present image forming apparatus 100 has a configuration in which a 2400 dpi exposure system is used, and a screen is generated by binary values for 2400 dpi. In a case of normal AM screening, 1 pixel is the smallest dot as illustrated in a screen A of FIG. 15. A screen that uses this dot is referred to as a screen A. In addition, a screen B that has 2×2 pixels for 1200 dpi as a smallest dot, a screen C that has 3×3 pixels as a smallest dot, a screen D that has 4×4 pixels as a smallest dot, a screen E that has 5×5 pixels as a smallest dot, and a screen F that has 6×6 pixels as a smallest dot are used. Note that although the shape of each dot is given as a square shape, the present invention is not limited to this.

FIG. 22A is a view for illustrating an example of a threshold matrix for tone reproduction of a normal AM screen when the smallest dot size is seven dots, and FIG. 22B is a view illustrating an example of a threshold matrix for a tone reproduction of a screen according to embodiments. Note that illustration is given with the shape of each dot as a convex shape, for example.

In addition, FIG. 23A is a view for illustrating an example of a threshold matrix for tone reproduction of a normal AM screen when the smallest dot size is five dots, and FIG. 23B is a view illustrating an example of a threshold matrix for a tone reproduction of a screen according to embodiments. Note that illustration is given with the shape of each dot as a cross shape, for example.

Figure 16:
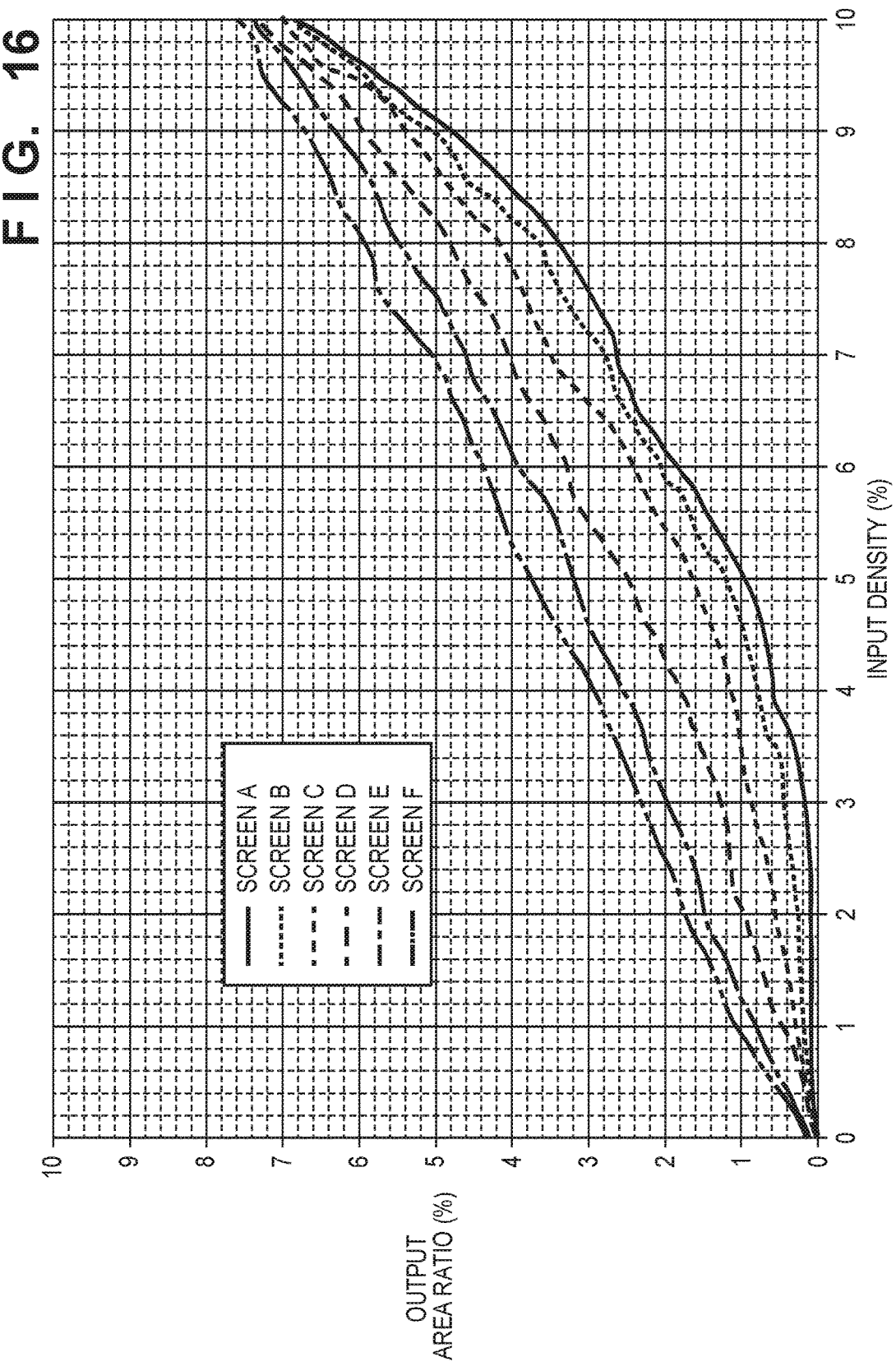
FIG. 16 is a view illustrating an example of relationships between an area ratio of halftone dots and an input density of screens, according to an embodiment.

FIG. 16 is a view illustrating an example of relationships between an area ratio of halftone dots and an input density of screens used in this embodiment. In FIG. 16, illustration is given for an example of an area ratio of halftone dots for a region where an input density is less than 10% in an environment, in a case where these screens are used.

Calculation of the area ratio of halftone dots is performed using the Murray-Davies method which compares a solid density with a halftone dot density of an output patch, and is indicated by Equation (6) below.

The area ratio of halftone dots=
$((1-10^{-DT})/(1-10^{-DS}))\times 100\%$ (6), here DT is density of halftone area, and DS is a solid density.

The reproducibility (halftone dot reproducibility) of output with respect to an input area ratio (density) is calculated by Equation (7) from the area ratio of halftone dots of each screen in the environment where this graph is obtained.

(Halftone dot reproducibility)=(area ratio of halftone dots)/(input area ratio)×100% (7)

When the halftone dot reproducibility of each screen for an output condition of the image forming apparatus 100 is obtained by a least-squares method, it is 20% for the screen A, 25% for the screen B, 35% for the screen C, and 50% for the screen D. Furthermore, it is 60% for the screen E, and 75% for the screen F. These results indicate that, in an output condition where this graph is obtained, the screens A and B are inappropriate for the tone reproduction, and the screens C, D, E, and F are suitable for the tone reproduction.

Furthermore, because a smallest dot size being small means visibility of dots decreases and makes the structure of the screen hard to perceive, it is suitable for a smallest dot to be as small as possible. Accordingly, it is possible to select C or D from screens that are optimal to select in this environment, and the screen C having the smaller smallest dot size was selected.

With reference to FIG. 17, description is given regarding visual observation evaluation results for halftone images in the environment in which the graph of FIG. 16 was created in the present embodiment. In FIG. 17, the screens C and D have achieved the evaluation that there is no jaggedness (noise), dots are not likely to be conspicuous, and pseudo contours do not occur. With other screens, a good evaluation is not achieved for at least one out of three evaluations (for jaggedness (noise), the likelihood for dots not to be conspicuous, and pseudo contours). Accordingly, as described above, it is desirable that the screen C having the smaller smallest dot size is selected as the optimal screen.

In the image forming apparatus 100, a LUT is created by automatically selecting an optimal screen after making calculations from halftone dot reproducibility of dither patterns of a plurality of smallest dot sizes (A, B, C, D, E, and F in the present embodiment) in accordance with a test print at a time of an image adjustment in accordance with a user trigger.

Figure 19:
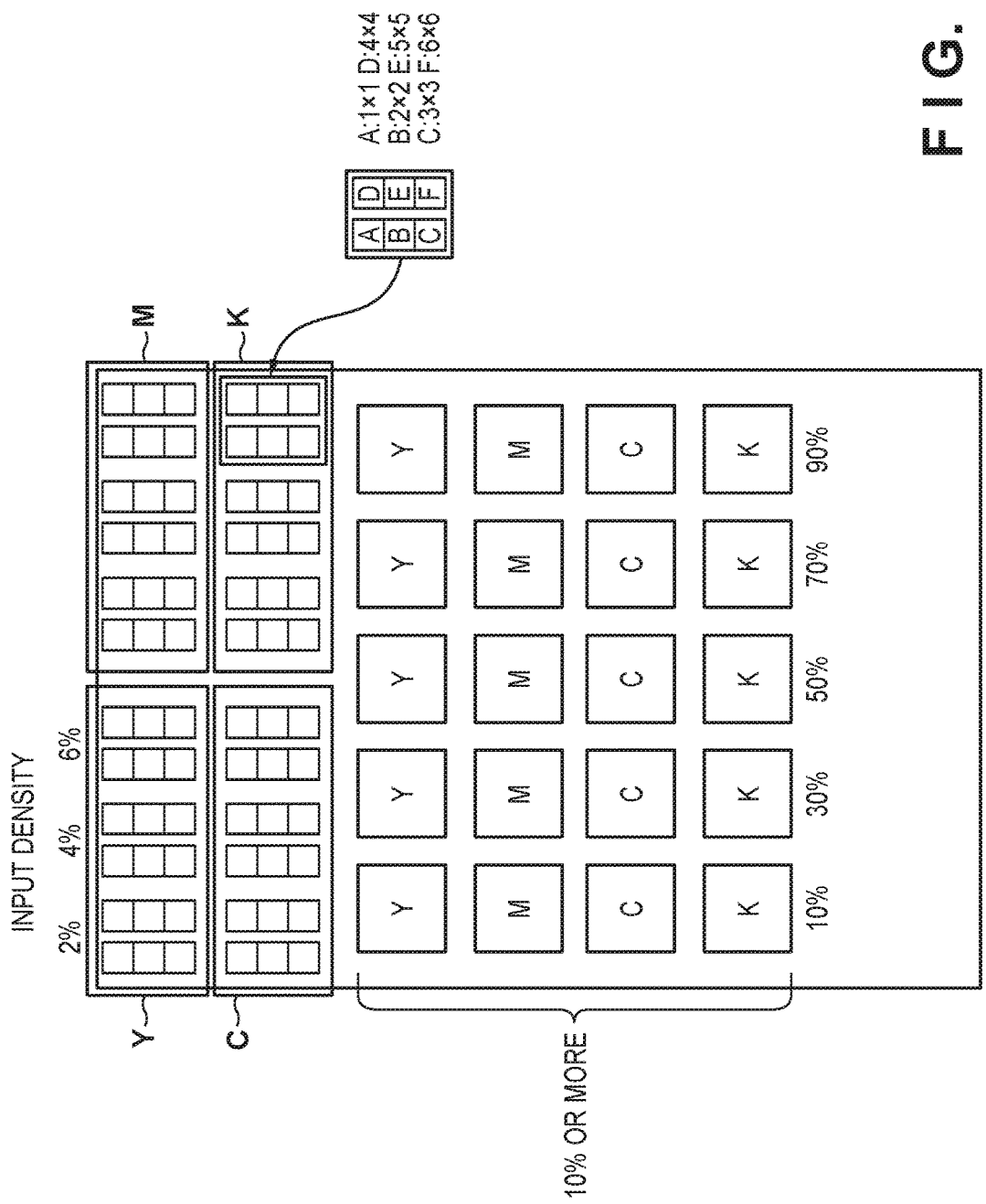
FIG. 19 is a view for illustrating the test print 2 for image adjustment, according to an embodiment.

In the present embodiment, as illustrated by the test print 2 of FIG. 19, a region having a density less than 10% is allocated patches having different smallest dot sizes, and the smallest dot size for each color is decided by calculating the halftone dot reproducibility from the density of these patches. In the test print 2, patches of a plurality of smallest dot sizes (FIGS. 14A and 14B) are arranged in regions with a density less than 10%, and for regions with density of 10% or more patches in accordance with normal AM screening are arranged and the same screen is taken irrespective of the smallest dot size. In the present embodiment, patches having the six types of sizes illustrated in FIG. 15 as the smallest dot are prepared, and patches of each color for densities of 2%, 4%, and 6% are arranged.

<Screen Selection>

Figure 2:
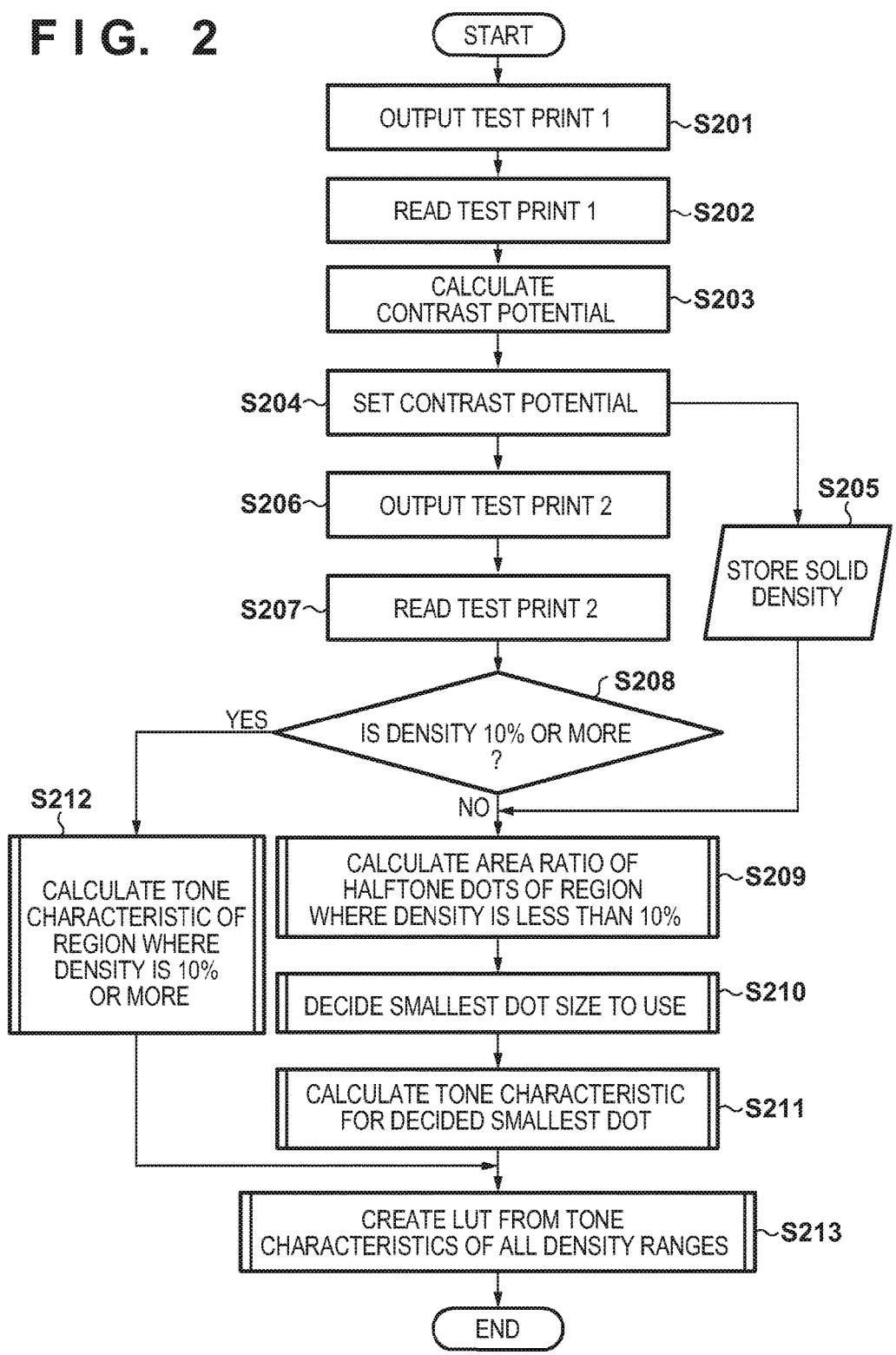
FIG. 2 is a flow diagram for selecting a smallest dot size according to an embodiment.

Next, with reference to FIG. 2, description is given regarding a procedure for selecting a screen in the present embodiment. Processing of this flowchart is realized by the CPU 514 controlling the reader unit A, and the CPU 428 controlling the printer unit B. Note that this processing is processing that is incorporated in the automatic tone correction in FIG. 7 which is already described, and detailed description is omitted for portions that overlap with processing of some of FIG. 7. In other words, the flowchart of FIG. 7 is something that executes a normal automatic tone correction, and the flowchart of FIG. 2 which is described here incorporates processing for deciding the smallest dot size of an AM screen in the automatic tone correction. Accordingly, description that overlaps that of FIG. 7 is omitted.

In step S201, the CPU 428 of the printer unit B performs output of the test print 1 upon accepting an instruction for execution of an automatic tone correction in accordance with user input. This processing is similar to step S51 of FIG. 7. Next, in step S202, the CPU 514 of the reader unit A reads the output of the test print 1 of step S201 which has been placed on the original platen by a user. This processing is similar to the processing of step S52 of FIG. 7. In step S203, the CPU 428 calculates a necessary contrast potential from a solid density. This processing is similar to the processing of step S53 of FIG. 7. Furthermore, in step S204, the CPU 428 sets the contrast potential. Here, the CPU 428 stores the solid density in memory (step S205), and uses it in step S207 which is described later.

Next, in step S206, the CPU 428 outputs the test print 2 which is described above. Next, in step S207, the CPU 514 reads output of the test print 2 which has been placed on the original platen by a user. In step S208, the CPU 428 determines for each read region whether it is a region having a density of 10% or more, advances to step S212 for processing of the read data in a region having density of 10% or more, and advances to step S209 for processing of read data in a region having density less than 10%.

In step S209, the CPU 428 calculates a halftone dot reproduction rate from the stored solid density and the patch densities of regions with density less than 10%. Next, in step S210, the CPU 428 selects a smallest size from dot sizes having a halftone dot reproducibility of 30% or more which is calculated from the halftone dot reproduction rate. Furthermore, in step S211, the CPU 428 calculates a tone characteristic from a screen patch of the selected smallest dot size (a region having density less than 10%), and the processing proceeds to step S213.

Meanwhile, in step S212, the CPU 428 calculates the tone characteristic for regions having density of 10% or more, and the processing proceeds to step S213.

In step S213, the CPU 428 creates an LUT from the tone characteristics for all density ranges, and the processing ends. By the above processing, the smallest dot size is defined, tone is represented by a number of dots that define a highlight region, and after grid points for the halftone dot pattern of a screen are arranged (filled), tone representation by normal AM screening is performed.

As described above, the image forming apparatus according to the present embodiment forms a predetermined test pattern on a sheet upon accepting processing for adjusting an image forming condition in accordance with a user input, and detects the density of the predetermined test patterns. Furthermore, the image forming apparatus obtains an area ratio of halftone dots in a highlight region of a formed image from the detected density, and, based on the area ratio of halftone dots, decides a smallest dot size for a screen that represents a halftone of the highlight region by a dither pattern. In this way, by virtue of the present embodiment, a test pattern is actually formed, and selection is made for a screen having a smallest dot size that is optimal for an output condition such as a number of output sheets, a state of a fixing member, a transferring member, a developer, or a photosensitive member, or a usage environment of the image forming apparatus. Consequently, by virtue of the present embodiment, it is possible to stabilize tone reproducibility irrespective of an output condition of the image forming apparatus, and stably perform high-quality image output.

Second Embodiment

Below, description will be given for a second embodiment of the present invention. In the first embodiment described above, description was given regarding control for performing selection of an optimal screen by using a test print placed on an original platen by a user in an automatic tone correction whose execution is triggered by a user instruction. In contrast, the present embodiment is characterized by performing measurement of a patch on an output sheet that is a test print by using a color sensor 200 illustrated in FIG. 1.

In other words, the present embodiment is characterized in further reducing work for a user in comparison to the first embodiment described above.

Figure 20:
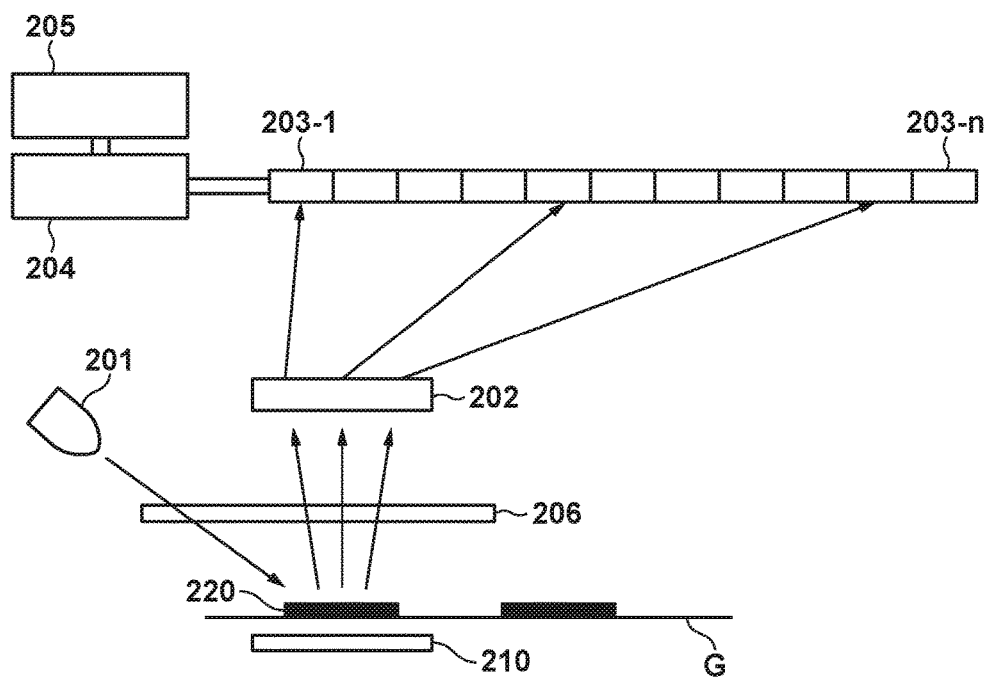
FIG. 20 is an overview configuration diagram of a color sensor according to an embodiment.

Firstly, with reference to FIG. 20, description is given regarding a spectral type optical sensor that is the color sensor 200 used in the present embodiment. As illustrated by FIG. 20, the color sensor 200 is provided with a white LED 201 that irradiates light onto a toner patch 220 on an original G on which a test pattern is formed, and a diffraction grating 202 for dispersing light reflected from the toner patch 220 by wavelength. In addition, the color sensor 200 is provided with a line sensor 203 (203-1 through 203-$n$) comprising n pixels for detecting light that is dispersed by wavelength by the diffraction grating 202. Furthermore, the color sensor 200 is provided with a calculation unit 204 for performing various calculations from light intensity values of respective pixels that are detected by the line sensor 203, and a memory 205 for saving various data. The calculation unit 204 has, for example, a Lab calculation unit for calculating Lab values or a density calculation unit for calculating densities, from the light intensity values. Note that the color sensor 200 may have a configuration where a lens 206 for focusing light irradiated from the white LED 201 onto the toner patch 220 on the original G, and for focusing light reflected from the toner patch 220 onto a diffraction grating is integrated therein.

Figure 21A:
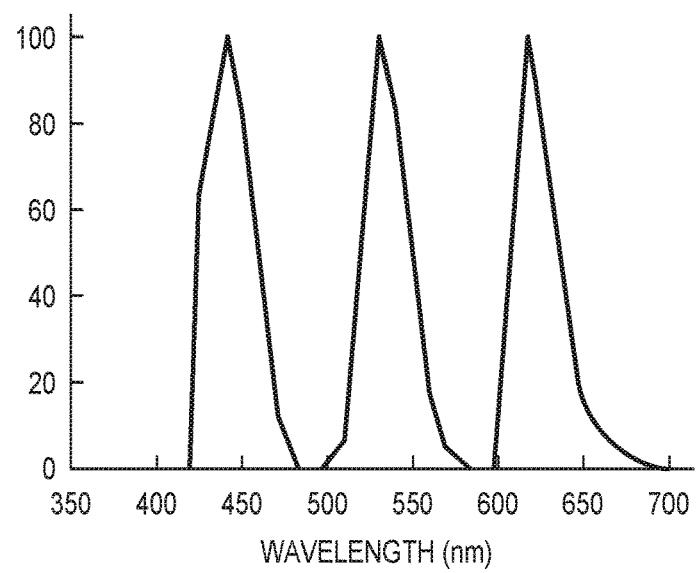
FIGS. 21A and 21B are views for illustrating a filter sensitivity characteristic used at a time of density calculation processing by a color sensor according to an embodiment.
Figure 21B:
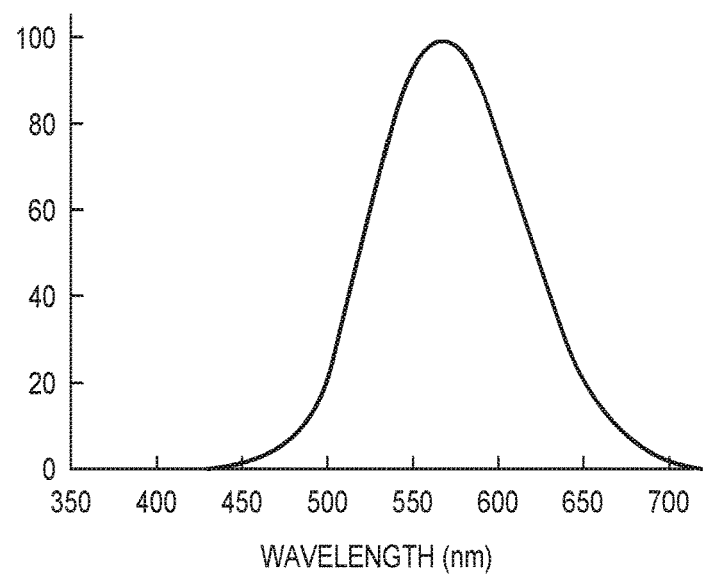

In the present embodiment, spectral reflectance is measured by the color sensor 200 from a patch of the original G, and density is calculated. For a calculation for making a conversion to a density value, a status A filter as in FIG. 21A is used with respect to the spectral reflectance for respectively obtained wavelengths to calculate density for yellow, magenta, and cyan. In addition, for black, a visibility spectral characteristic (may be referred to as Visual) as in FIG. 21B is used to calculate density. From a measured density, the area ratio of halftone dots is calculated by a procedure that is the same as that in the first embodiment described above, and a screen having an optimal smallest dot size is selected.

As described above, in the present embodiment, a color sensor for reading density of a test pattern is provided on a conveyance path along which a sheet on which the test pattern is formed is conveyed, in the image forming apparatus. Because of this, by merely causing an image adjustment to start, an image adjustment is automatically performed to the convenience of reducing a user operation as much as possible and control being performed automatically in accordance with a number of output sheets of the image forming apparatus is also possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-123563 filed on Jun. 23, 2017, which is hereby incorporated by reference herein in its entirety.

What is claimed is:

1. An image forming apparatus, the apparatus comprising:
    a user interface that accepts, in accordance with user input, an instruction for execution of processing for adjusting an image forming condition;
    an image forming unit that forms a predetermined test pattern on a sheet in response to the acceptance of the instruction by the user interface;
    a reading unit that detects a density of the predetermined test pattern formed on the sheet by the formation unit;
    a memory device that stores a set of instructions; and
    at least one processor that executes the set of instructions to:
    obtain an area ratio of halftone dots in a highlight region of an image formed by the image forming unit, from the density detected by the reading unit, and
    decide, based on the obtained area ratio of halftone dots, a smallest dot size of a screen for representing, by a dither pattern, a halftone of the highlight region.

2. The image forming apparatus according to claim 1, wherein the at least one processor the set of executes instructions in the memory device to:
    display on an operation unit a display prompting that the sheet on which the predetermined test pattern is formed by the image forming unit be placed at a position that enables detection by the reading unit.

3. The image forming apparatus according to claim 2, wherein
    the display includes a display designating an orientation in which to place the sheet.

4. The image forming apparatus according to claim 1, wherein the reading unit is provided on a conveyance path for conveying the sheet on which the predetermined test pattern is formed by the image forming unit, and detects the density of the predetermined test pattern from the conveyed sheet.

5. The image forming apparatus according to claim 1, wherein the at least one processor executes the set of instructions in the memory device to:
    calculate a halftone dot reproducibility from the area ratio of halftone dots in accordance with the following equation:

(Halftone dot reproducibility)=(area ratio of halftone dots)/(input area ratio)×100%, and decide a dot size for which a halftone dot reproducibility is 30% or more as the smallest dot size.

6. The image forming apparatus according to claim 1, wherein the at least one processor executes instructions in the memory device to:
obtain the area ratio of halftone dots by the following equation:

the area ratio of halftone dots= $((1-10^{-DT})/(1-10^{-DS}))\times 100(\%)$ where DT represents density of halftone area, and DS represents solid density.

7. The image forming apparatus according to claim 1, wherein the image forming unit forms, as the predetermined test pattern, patterns of a plurality of dot sizes in a density range where an image density is less than 10%.

8. The image forming apparatus according to claim 7, wherein the at least one processor executes the set of instructions in the memory device to:
decide as the smallest dot size a smallest dot size out of usable dot sizes from the plurality of dot sizes.

9. The image forming apparatus according to claim 1, wherein the at least one processor executes the set of instructions in the memory device to:
create a lookup table using the decided smallest dot size, and
wherein the lookup table is created so that a tone representation is performed in accordance with area modulation of dots after smallest dots of a fixed size are arranged to all grid points of the dither pattern.

10. The image forming apparatus according to claim 1, wherein the screen represents a tone of the highlight region using a number of dots.

11. A method of controlling an image forming apparatus, the method comprising:
accepting, in accordance with user input, an instruction for execution of processing for adjusting an image forming condition;
forming a predetermined test pattern on a sheet in response to the acceptance of the instruction;
detecting a density of the predetermined test pattern formed on the sheet;
obtaining an area ratio of halftone dots in a highlight region of an image formed, from the density detected; and
deciding, based on the obtained area ratio of halftone dots, a smallest dot size of a screen for representing, by a dither pattern, a halftone of the highlight region.

12. A non-transitory computer-readable storage medium storing a computer program for causing a computer to execute each step in a method of controlling an image forming apparatus, the method comprising:
accepting, in accordance with user input, an instruction for execution of processing for adjusting an image forming condition;
forming a predetermined test pattern on a sheet in response to the acceptance of the instruction;
detecting a density of the predetermined test pattern formed on the sheet;
obtaining an area ratio of halftone dots in a highlight region of an image formed, from the density detected; and
deciding, based on the obtained area ratio of halftone dots, a smallest dot size of a screen for representing, by a dither pattern, a halftone of the highlight region.

* * * * *